(12) United States Patent
Hong et al.

(10) Patent No.: US 7,319,648 B2
(45) Date of Patent: Jan. 15, 2008

(54) APPARATUS AND METHOD FOR REPRODUCING RECORD FOR OPTICAL RECORDING MEDIUM

(75) Inventors: Seong Pyo Hong, Seoul (KR); Sang On Park, Kyonggi-do (KR); Won Hyoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 10/623,654

(22) Filed: Jul. 22, 2003

(65) Prior Publication Data

US 2004/0125710 A1  Jul. 1, 2004

Related U.S. Application Data

(62) Division of application No. 09/538,748, filed on Mar. 30, 2000, now Pat. No. 6,625,093.

(30) Foreign Application Priority Data

| Mar. 30, 1999 | (KR) | 1999-11024 |
| Apr. 16, 1999 | (KR) | 1999-13569 |
| Apr. 21, 1999 | (KR) | 1999-14239 |
| May 25, 1999 | (KR) | 1999-18896 |
| May 25, 1999 | (KR) | 1999-18897 |
| May 25, 1999 | (KR) | 1999-18900 |

(51) Int. Cl.
    *G11B 7/00* (2006.01)
(52) U.S. Cl. .................. 369/53.19; 369/44.32
(58) Field of Classification Search ............. 369/44.32, 369/44.36, 44.26, 47.54, 47.23, 47.48, 53.19, 369/53.22, 275.3, 275.4, 44.27, 59.25, 44.41, 369/44.29, 44.42, 44.11, 47.1, 47.28, 124.01
See application file for complete search history.

(56) References Cited

U.S. PATENT DOCUMENTS

| 5,224,085 | A | | 6/1993 | Shinkai et al. | |
| 5,862,112 | A | * | 1/1999 | Nagai et al. | 369/44.36 |
| 5,886,962 | A | | 3/1999 | Takamine et al. | |
| 5,933,410 | A | * | 8/1999 | Nakane et al. | 369/275.3 |
| 5,963,516 | A | | 10/1999 | Hashimoto et al. | |
| 6,097,678 | A | * | 8/2000 | Yoshida et al. | 369/47.48 |

(Continued)

FOREIGN PATENT DOCUMENTS

JP  10-208250  7/1998

*Primary Examiner*—Andrea Wellington
*Assistant Examiner*—Kim-Kwok Chu
(74) *Attorney, Agent, or Firm*—Birch, Stewart, Kolasch & Birch, LLP

(57) ABSTRACT

The method for reproducing records for the optical recording medium detects and compensates for detrack, tilt and defocus, having advantages in that: (1) the magnitude and the direction of detrack, tilt and defocus can be detected from a difference signal (for example, a read channel 2 signal or a tracking error signal obtained by processing the read channel 2 signal) between optical reflecting signals detected at the header fields staggered on the basis of the tract center, and compensates for detrack, tilt and defocus, thereby preventing deterioration of data quality caused by detrack, tilt and defocus during a recording/reproducing operation and enabling the stable operation of the system; and (2) the focus servo is rapidly stabilized to enable real-time recording as well as the stable operation of the system.

26 Claims, 25 Drawing Sheets

U.S. PATENT DOCUMENTS

| | | | |
|---|---|---|---|
| 6,298,033 B1 * | 10/2001 | Tanoue et al. | 369/275.3 |
| 6,333,902 B1 * | 12/2001 | Shim | 369/47.54 |
| 6,418,104 B1 * | 7/2002 | Sato et al. | 369/53.19 |
| 6,459,661 B1 * | 10/2002 | Iwanaga | 369/44.26 |
| 6,469,979 B1 * | 10/2002 | Joo et al. | 369/275.3 |
| 6,625,093 B1 * | 9/2003 | Hong et al. | 369/44.32 |
| 6,631,114 B1 * | 10/2003 | Kobayashi | 369/275.4 |

* cited by examiner tilt=0, detrack offset=0
defocus offset=4.08 tilt=0, detrack offset=4.97
defocus offset=4.08 tilt=0, detrack offset=10
defocus offset=4.08 tilt=0, detrack offset=0
defocus offset=4.08 tilt=0, detrack offset=4.97
defocus offset=4.08 tilt=0, detrack offset=10
defocus offset=4.08 tilt=1, detrack offset=4.97
defocus offset=4.08 tilt=0, detrack offset=4.97
defocus offset=4.08 tilt=-1, detrack offset=4.97
defocus offset=4.08 tilt=1, detrack offset=4.97
defocus offset=4.08 tilt=0, detrack offset=4.97
defocus offset=4.08 tilt=-1, detrack offset=4.97
defocus offset=4.08 tilt=1, detrack offset=4.97
defocus offset=4.08 tilt=0, detrack offset=4.97
defocus offset=4.08 tilt=-1, detrack offset=4.97
defocus offset=4.08 tilt=0,detrack offset=4.97
defocus offset=2.0 tilt=0,detrack offset=4.97
defocus offset=4.08 tilt=0,detrack offset=4.97
defocus offset=8.0 tilt=0, detrack offset=4.97
defocus offset=2.0 tilt=0, detrack offset=4.97
defocus offset=4.08 tilt=0, detrack offset=4.97
defocus offset=8.0 tilt=0, detrack offset=4.97
defocus offset=2.0 tilt=0, detrack offset=4.97
defocus offset=4.8 tilt=0, detrack offset=4.97
defocus offset=8.0

APPARATUS AND METHOD FOR REPRODUCING RECORD FOR OPTICAL RECORDING MEDIUM

This application is a divisional of application Ser. No. 09/538,748, filed on Mar. 30, 2000, now U.S. Pat. No. 6,625,093 the entire contents of which are hereby incorporated by reference and for which priority is claimed under 35 U.S.C. § 120; and this application claims priority of Application Nos. 11024/1999 filed in Korea on Mar. 30, 1999, 13569/1999 filed in Korea on Apr. 16, 1999, 14239/1999 filed in Korea on Apr. 21, 1999, 18900/1999 filed in Korea on May 25, 1999, 18896/1999 filed in Korea on May 25, 1999, and 18897/1999 filed in Korea on May 25, 1999 under 35 U.S.C. § 119.

BACKGROUND OF THE INVENTION

1. Field of the Invention

The present invention relates generally to a high-density optical recording medium system and, more particularly, to an apparatus and method for reproducing records for optical recording medium, capable of detecting and compensating for detrack, tilt and defocus of the optical recording medium.

2. Description of the Related Art

In general, examples of optionally and iteratively rewritable optical recording medium include rewritable compact disc (CD-RW) and rewritable digital versatile disc (DVD-RW, DVD-RAM, DVD+RW).

These rewritable optical discs, particularly, DVD-RAMs have signal tracks made up of lands and grooves and enable the tracking control of an empty disc on which no information signal is written. Recently, information signals are also written on the tracks of lands and grooves so as to enhance recording density. For this purpose, the recent optical pickup for writing and reading information signals uses the shorter wavelength of laser beam with an increased number of apertures formed in the object lens and thereby reduces the size of beam for writing/reading records.

In order to achieve higher recording density, such a rewritable high-density optical disc is designed to have a reduced distance between the signal tracks, i.e., the smaller signal track pitch.

For the rewritable discs, it is naturally impossible to perform a disc control and a recording operation in an empty disc in which no information is written. Thus disc tracks are formed in lands and grooves to write information on, and control information for random access and rotation control is separately recorded in the disc, so as to enable tracking control in the empty disc.

The control information is, as shown in FIG. 1, written on the header pre-formatted at the beginning position of each sector, or along the track in the wobbling profile. The term "wobbling" as used herein refers to recording the control information on the boundary of tracks in accord to variation of laser beam by supplying power of laser diodes with information for modulating a predetermined clock and applying the modulated clock to the disc, e.g., information about a desired position and the rotational speed of the disc.

In a DVD-RAM, the header preformatted at the beginning position of each sector includes four header fields, e.g., header 1 field, header 2 field, header 3 field and header 4 field. Each header field has variable frequency oscillator (VFO) areas for generating a reference clock to acquire bit synchronization of read channels. In the present invention, the VFO areas present in the respective header fields (header 1 field~header 4 field) are called VFO1~VFO4.

That is, VFO1 and VFO 3 areas are present in the header 1 field and the header 3 field, VFO2 and VFO4 areas being in the header 2 field and the header 4 field. The VFO1 and VFO3 areas are longer and more stable for signal detection than the VFO2 and VFO4 areas.

The four header fields are staggered with respect to each other from the track center. FIG. 1 shows an example of the header for the first sector in a track. Referring to FIG. 1, the track boundary of the user area in which data are actually written has a wobbling profile.

An optical record reproducing apparatus also performs tracking and focus controls with an optical pickup in writing and reading information.

That is, tracking control, e.g., tracking servo involves detection of tracking error signals from electrical signals generated in accordance to the beam trace status and driving a tracking actuator in the optical pickup based on the tracking error signals to move an object lens of the optical pickup in the radial direction, thereby changing the position of the beam to trace a desired track.

There are some cases where detrack occurs that the beam focus is deflected from the track center, even though no tracking error signal is detected. Detrack does not adversely affect the compact discs.

However, detrack has an adverse effect on the optical discs such as DVD-RAM where data writing and reading is enabled in both lands and grooves, because the track pitch is narrowed for purpose of high densification.

Due to a depth difference between lands and grooves, detrack may occur in the tracks of the grooves even when no detrack is detected in the tracks of the lands. Likewise, the tracks of the lands may have detrack while there is no detrack detected in the tracks of the grooves.

If detrack occurs, writing/reading data becomes harder because the beam is ready to shift to the adjacent track to cause a cross talk and clear data from the track.

In a case where the beam focus is deflected from the disc surface during a focus control, i.e., focus servo, which case will be referred to as "defocus" hereinafter, quality of data deteriorates in writing and reading the data and thereby the system operation becomes unstable.

The focus servo drives a focus actuator in the optical pickup to move the optical pickup up or down and make the beam in focus according to the turning and up-and-down motions of the optical disc. That is, the focus actuator drives the object lens for convergence of beam in the upward/downward direction, e.g., in a direction of the focus axis to maintain a constant distance between the object lens and the optical disc.

However, in the optical discs such as DVD-RAM where data can be written in both lands and grooves, the lands and grooves differ in the focus offset from each other due to a depth difference and cause defocus even when no focus error signal is detected.

That is, due to the depth difference between the lands and grooves, defocus may be detected in the tracks of the grooves even when no detrack occurs in the tracks of the lands. Likewise, the tracks of the lands may have detrack while detrack is not detected in the tracks of the grooves.

As the defocus status cannot be known only from the focus error signals in this case, jitter characteristic deteriorates and the bit error rate (BER) increases. Recording data in this state may result in change recording characteristics of lands and grooves and hence deterioration of data quality, which makes the system operation unstable.

During a resin extracting and hardening process in fabrication of the optical disc, distortion may take place in the optical disc and cause eccentricity even when a central aperture is perforated in optical disc. Also, deviation of the central aperture causes eccentricity although the tracks of the disc are accurately provided in the radial form with a defined pitch. Thus as the disc turns with eccentricity, the central axis of the motor is not in perfect accord with the center of the track.

It is thus hard to read out the signals of a desired track only. So, in the CD and DVD systems, a tracking servo is performed according to the standards established for the deflected quantity such that the beam always traces the desired track in spite of eccentricity.

It means, the tracking servo generates electrical signals corresponding to the beam trace status and moves the object lens or the optical pickup body in the radial direction based on the generated electrical signals, to change the position of the beam and make the beam trace the accurate track.

Meanwhile, the beam can be deflected from a desired track due to a tilt of the disc as well as the eccentricity. This results from a mechanic error occurring when the disc is set on a spindle motor. That is, the focusing direction is not in perpendicular relation with the tracking direction. This slant state of the disc is called "tilt".

Tilt is not so significant for compact discs that have a large tilt margin due to their wide track pitch. The term "tilt margin" as used herein refers to a compensable quantity of tilt of the disc. However, with a growing need of densification of the optical appliances such as optical discs, especially in the DVD having the narrower track pitch, a slight tilt of the disc causes the beam to shift to the adjacent track due to a small radial tilt margin for the jitter. This "detrack" is unavoidable by the tracking servo only. That is, the tracking servo may mistake that the beam is tracing the accurate track even when the beam is shifted to the adjacent track due to tilt, while focusing on the center of the track.

This makes it impossible to write/read data in/from a desired track. Thus a double distortion occurs when reading the erroneously written data.

To cope with this problem, there has been suggested a method in which the tilt of the disc can be detected with a dedicated tilt sensor, e.g., a tilt light-receiving device in an optical pickup. However, the method is not so efficient with a large size of the set.

SUMMARY OF THE INVENTION

It is, therefore, an object of the present invention to provide an apparatus and method for reproducing records for an optical recording medium, capable of detecting and compensating for detrack from header areas staggered with respect to each other.

It is another object of the present invention to provide an apparatus and method for reproducing records for an optical recording medium, capable of detecting and compensating for tilt from header areas staggered with respect to each other.

It is further another object of the present invention to provide an apparatus and method for reproducing records for an optical recording medium, capable of detecting and compensating for defocus from header areas staggered with respect to each other.

It is still another object of the present invention to provide an apparatus and method for reproducing records for an optical recording medium, capable of iteratively controlling detrack, tilt and defocus in a predefined order.

To achieve the above objects of the present invention, there is provided a method for reproducing records for optical recording medium includes the steps of: (a) determining a difference between a difference signal of optical reflecting signals of the optical recording medium detected at the non-writable area and the center level at an adjacent data area to output a first signal; (b) determining a difference between a difference signal of optical reflecting signals of the optical recording medium detected at a second non-writable area and the center level at an adjacent area to output a second signal, the second non-writable area being different in phase from the non-writable area; (c) determining a difference between the first signal and the second signal to output a variation; (d) comparing the variation with a predetermined threshold, determining that detrack has occurred, if the variation exceeds the threshold, and outputting the resulting value; and (e) performing a tracking servo based on the resulting value.

The difference signal between the optical reflecting signals includes a read channel 2 signal generated from electrical signals output in proportion to the quantity of beam reflected from the optical recording medium.

A read channel 1 signal means the total output of the split photo detectors. The read channel 2 signal means the differential output of the split photo detectors.

The difference signal between the optical reflecting signals includes a tracking error signal obtained by filtering the read channel 2 signal generated from electrical signals output in proportion to the quantity of beam reflected from the optical recording medium.

The tracking servo step (e) detects the magnitude and the direction of detrack from the resulting value and the sign of the variation, respectively.

The tracking servo step (e) performs the tracking servo in such a manner as to equalize the level of the first signal to the level of the second signal.

The tracking servo step (e) performs the tracking servo in such a manner that two tracking error signals of different phases is in symmetric relation with each other with respect to the center level of the adjacent data area.

In another aspect of the present invention, a method for reproducing records for optical recording medium includes the steps of: (a) determining a difference between a difference signal of optical reflecting signals of the optical recording medium detected at the non-writable area and the center level at an adjacent data area to output a first signal; (b) determining a difference between a difference signal of optical reflecting signals of the optical recording medium detected at a second non-writable area and the center level of an adjacent data area to output a second signal, the second non-writable area being different in phase from the non-writable area; (c) determining a difference between the first signal and the second signal to output a variation; (d) comparing the variation with a predetermined threshold, determining that tilt has occurred, if the variation exceeds the threshold, and outputting the resulting value; and (e) performing a tilt servo based on the resulting value.

The tilt servo step (e) detects the magnitude and the direction of tilt from the resulting value and the sign of the variation, respectively.

The tilt servo step (e) performs the tilt servo in such a manner as to equalize the level of the first signal to the level of the second signal.

The tilt servo step (e) performs the tilt servo in such a manner that two tracking error signals of different phases is in symmetric relation with each other with respect to the center level of the adjacent data area.

In further another aspect of the present invention, a method for reproducing records for optical recording medium includes the steps of: (a) determining, when no tilt is detected, a first potential difference between a ground level and a read channel 2 signal detected at the non-writable area, and setting the potential difference as a reference value; (b) determining, when necessary, a second potential difference between a second ground level and a second read channel 2 detected at the non-writable area, and comparing the first potential difference with the second potential difference; and (c) determining from the result of the comparison in step (b) that tilt has occurred, and performing a tilt servo.

In still further another aspect of the present invention, a method for reproducing records for optical recording medium includes the steps of: (a) determining a difference signal between optical reflecting signals each detected at the plural non-writable areas of different phases to output a variation; (b) comparing the variation with a predetermined threshold, determining that defocus has occurred, if the variation exceeds the threshold, and outputting the resulting value; and (c) performing a focus servo based on the resulting value.

In the variation outputting step (a), a peak-to-peak voltage of read channel 1 signals or read channel 2 signals detected at the non-writable areas is a first signal, and a peak-to-peak voltage of read channel 1 signals or read channel 2 signals detected at a second non-writable areas is a second signal, the second non-writable areas being different in phase from the non-writable areas, the variation being the difference between the first signal and the second signal.

The focus servo step (c) is performed in such a manner that the sum signal of the first and second signals is at maximum and the variation does not exceed the threshold.

The variation outputting step (a) includes the steps of: determining a potential difference between the tracking error signal detected at the non-writable area and the track center level of an adjacent data area to output a first signal; determining a potential difference between the tracking error signal detected at another non-writable area and the track center level of an adjacent data area to output a second signal; and determining a difference between the first and second signals as the variation.

The focus servo step (c) detects the magnitude and the direction of defocus from the resulting value and the sign of the variation, respectively.

The focus servo step (c) performs the focus servo in such a manner as to equalize the level of the first signal to the level of the second signal.

In still further another aspect of the present invention, a method for reproducing records for optical recording medium includes the steps of: (a) detecting a first variation from a first potential difference between a difference signal of optical reflecting signals each detected at the plural non-writable areas of difference phases and a first reference level, and detecting and compensating detrack of the optical recording medium from the first variation; (b) detecting a second variation from a second potential difference between a difference signal of optical reflecting signals each detected at the plural non-writable areas of difference phases and a second reference level, and detecting and compensating tilt of the optical recording medium from the second variation; and (c) detecting a third variation from a third potential difference between a difference signal of optical reflecting signals each detected at the plural non-writable areas of difference phases and a third reference level, and detecting and compensating defocus of the optical recording medium from the third variation, wherein the detecting and compensating steps are performed in the order of detrack, tilt and defocus.

In still further another aspect of the present invention, an apparatus for reproducing records for optical recording medium includes: a signal generator for generating a difference signal between optical reflecting signals from electrical signals generated from an optical pickup for recording/reproducing information on/from the optical recording medium; a detrack detector for detecting detrack of the optical recording medium from a variation of the difference signal between the optical reflecting signals of the non-writable areas output from the signal generator, and outputting a detrack error signal; a tilt detector for detecting tilt of the optical recording medium from a variation of the difference signal between the optical reflecting signals of the non-writable areas output from the signal generator, and outputting a tilt error signal; a defocus detector for detecting defocus of the optical recording medium from a variation of the difference signal between the optical reflecting signals of the non-writable areas output from the signal generator, and outputting a defocus error signal; a servo controller for generating a tracking driving signal from the detrack error signal detected at the detract detector, a tilt driving signal from the tilt error signal detected at the tilt detector, and a focus driving signal from the defocus error signal detected at the defocus detector; a tracking driver for controlling the optical pickup based on the tracking driving signal to compensate for detrack; a tilt driver for controlling the optical pickup based on the tilt driving signal to compensate for tilt; and a focus driver for controlling the optical pickup based on the focus driving signal to compensate for defocus.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described below with reference to the accompanying drawings. In the following description, well-known functions or constructions are not described in detail since they would obscure the invention in unnecessary detail.

The present invention is directed to detection and compensation of detrack, tilt and defocus using variation of a difference signal (e.g., a read channel 2 signal or a tracking error signal obtained from the read channel 2 signal processed) between optical reflecting signals detected from header fields staggered on the basis of track sectors.

Figure 2:
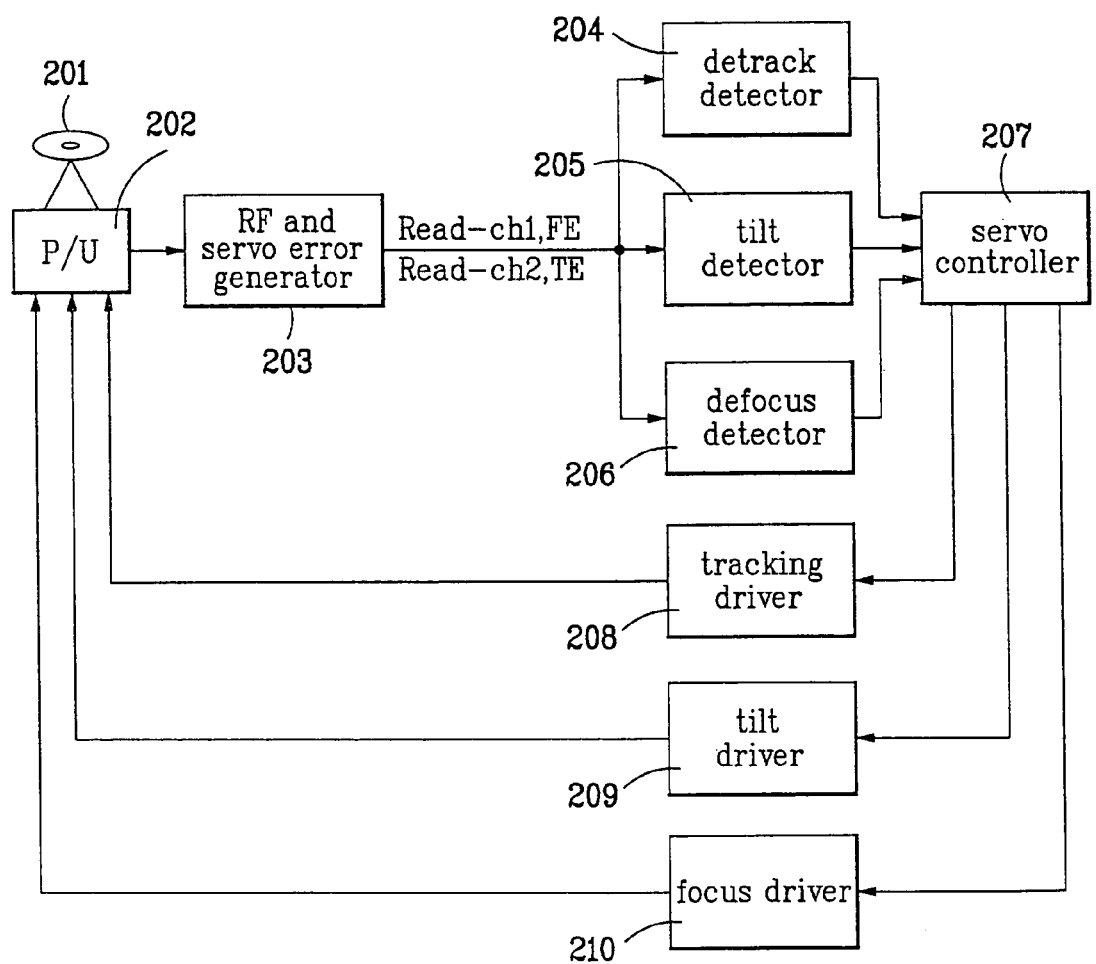
FIG. 2 is a block diagram showing the structure of an optical disc writing/reading apparatus for controlling detrack, tilt and defocus in accordance with the present invention.

FIG. 2 is a block diagram showing the structure of an optical disc writing/reading apparatus for reproducing records from an optical disc in accordance with the present invention, in which only the principal parts related to detrack, tilt and defocus are shown.

Referring to FIG. 2, the optical disc writing/reading apparatus includes: a rewritable optical disc 201; an optical pickup 202 for writing/reading information on/from the optical disc 201; an RF and servo error generator 203 for generating an RF signal and a servo error signal (e.g., tracking error signal, focus error signal, etc.) from electrical signals output from the optical pickup 202; a detrack detector 204 for detecting detrack from the read channel 2 signal or the tracking error signal output from the RF and servo error generator 203; a tilt detector 205 for detecting tilt from the read channel 2 signal or the tracking error signal; a defocus detector 206 for detecting defocus from the read channel 2 signal or the tracking error signal; a servo controller 207 for generating a tracking driving signal from the magnitude and the direction of detrack detected at the detrack detector 204, a tilt driving signal from the magnitude and the direction of tilt detected at the tilt detector 205, and a focus driving signal from the magnitude and the direction of defocus detected at the defocus detector 206; a tracking driver 208 for controlling the optical pickup 202 based on the tracking driving signal to compensate for the detrack; a tilt driver 209 for controlling the optical pickup 202 based on the tilt driving signal to compensate for the tilt; and a focus driver 210 for controlling the optical pickup 202 based on the focus driving signal to compensate for the defocus.

Figure 3:
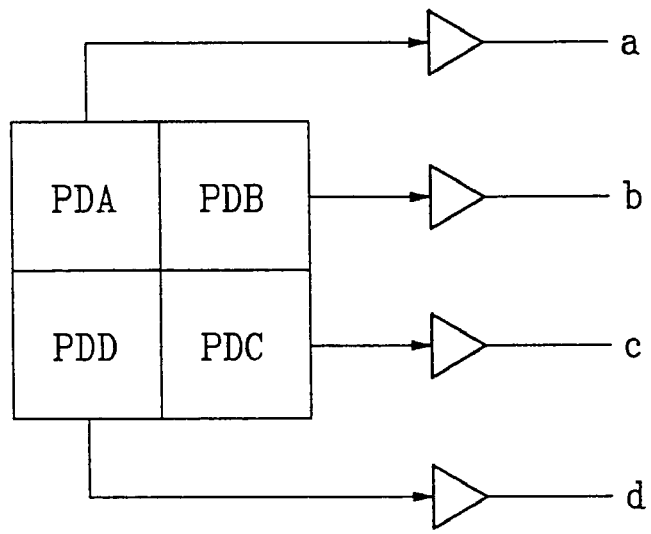
FIG. 3 is an exemplary diagram showing an optical detector of the optical pickup shown in FIG. 2.

The optical pickup 202 has a split photo detector for detecting the quantity of light and converting the detected quantity of light to electrical signals. The split photo detector can be divided, as shown in FIG. 3, into a predefined number of optical detecting elements, e.g., four optical detecting elements PDA, PDB, PDC and PDD in the signal track direction and the radial direction of the optical disc 201.A In the present invention as constructed above, the optical disc 201 has signal tracks made up of lands and grooves, and data can be written/read on/from the tracks of both the lands and the grooves as well as either the land tracks or the groove tracks. Also, at the beginning position of each sector, header 1 and 2 fields and header 3 and 4 fields are staggered with respect to each other in a free format. That is, the phases of the header 1 and 2 fields are in inverse relation with those of the header 3 and 4 fields.

Thus, while setting the optical disc 201, or during the writing/reading operation, the laser beam emitted from a laser diode of the optical pickup 202 is directed onto the signal tracks of the optical disc 201 and the beam reflected from the signal tracks of the optical disc 201 enters the split photo detector.

The split photo detector includes a plurality of optical detecting elements and outputs to the RF and servo error generator 203 electrical signals proportional to the quantity of beam obtained from the respective optical detecting elements.

The optical detector, if constructed as shown in FIG. 3, outputs to the RF and servo error generator 203 electrical signals a, b, c and d, each in proportion to the quantity of beam obtained from the respective optical detecting elements PDA, PDB, PDC and PDD.

The RF and servo error generator 203 combines the electrical signals a, b, c and d to generate an RF signal necessary for data reading, and a tracking error signal and a focus error signal, which are all necessary for a servo control. The read channel 1 signal is obtained by combining the electrical signals a, b, c and d from the split optical detector as a+b+c+d, and the read channel 2 signal is obtained by combining the electrical signals as (a+d)−(b+c). The tracking error signal is obtained by processing the read channel 2 signal through filtering.

The split photo detector, if divided into two photodiodes I1 and I2 in the direction of tracks, detects the read channel 1 signal (=I1+I2) and the read channel 2 signal (=I1−I2) from the beam quantity balance of both photodiodes.

Figure 1:
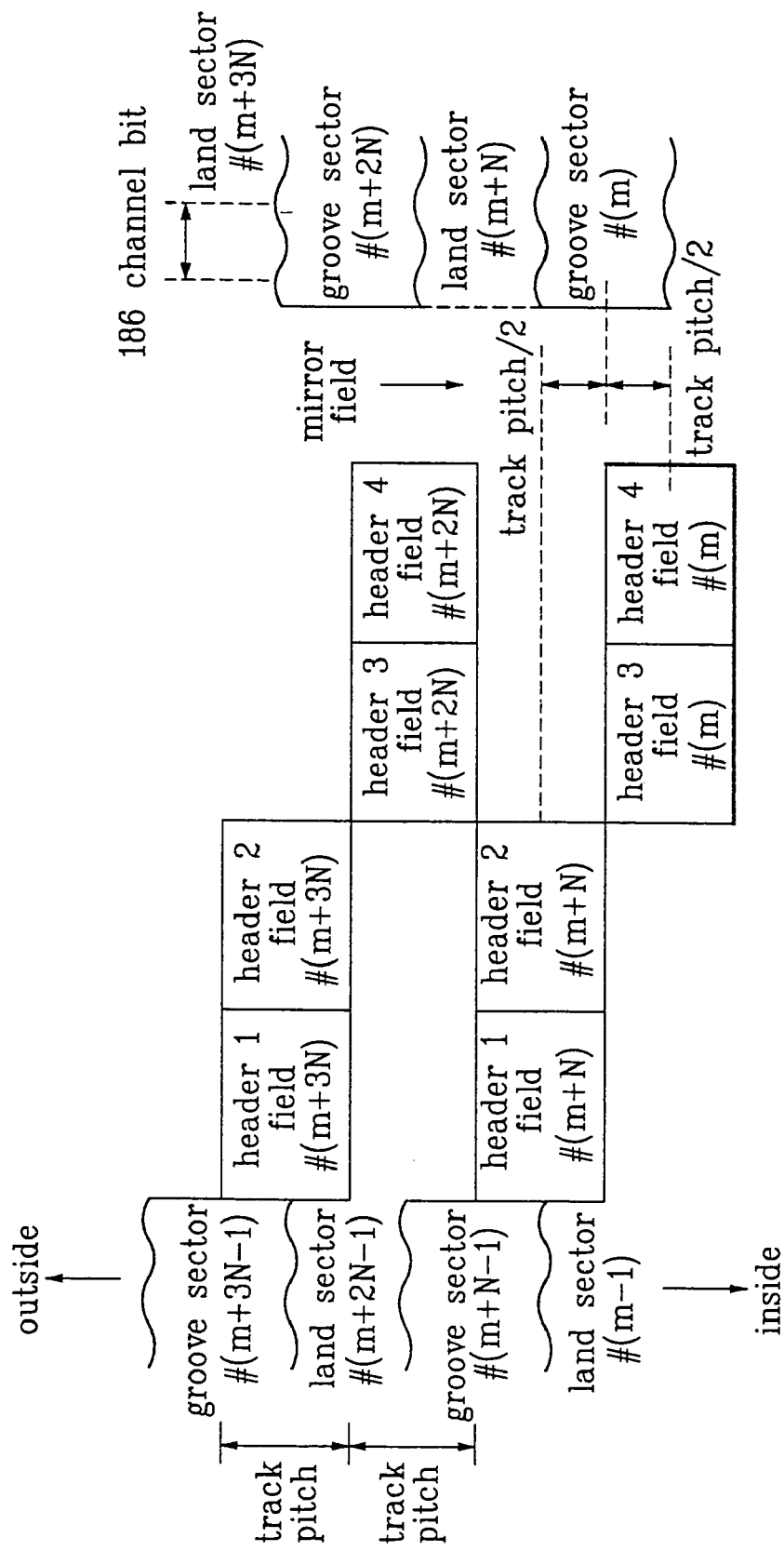
FIG. 1 is a diagram showing a staggered structure of a header preformatted at the beginning position of each sector in a general rewritable disc.

Here, a wobble signal written on each track as shown in FIG. 1 is detected only from the read channel 2 signal.

The present invention involves detection of detrack, tilt and defocus from variation of a difference signal between optical reflecting signals detected from header areas staggered on the basis of track center, and compensation for the detected detrack, tilt and defocus. Examples of the difference signal between the optical reflecting signals include a channel 2 signal and a tracking error signal, each of which will be separately described later.

The present invention also provides detection and compensation processes for detrack, tilt and defocus, each of which will be separately described below in the order of detrack, tilt and defocus.

Detrack Detection and Compensation

Using read channel 2 signal

The present invention detects detrack using a level difference between read channel 2 signals detected at VFO1 and VFO3 areas in the header field and a wobble signal in the data area. The reason for using the signals of VFO1 and VFO3 areas lies in that the VFO1 and VFO3 areas are the longest and most stable areas in the header field and easy to detect.

For this, among the error signals detected at the RF and servo error generator 203, read channel 2 signals are input to the detrack detector 204.

The levels of the read channel 2 signals detected at the VFO1 and VFO3 areas appear negligible due to variation of the detrack offset with focus and tracking on, as shown in Table 1.

TABLE 1

| Detrack Offset [ ] | VFO1 [V] | VFO3 [ ] |
|---|---|---|
| 0.00 | 0.201 | 0.183 |
| 1.00 | 0.187 | 0.194 |
| 2.00 | 0.183 | 0.190 |
| 3.00 | 0.192 | 0.185 |
| 4.00 | 0.183 | 0.197 |
| 5.00 | 0.183 | 0.201 |
| 6.00 | 0.187 | 0.206 |
| 7.00 | 0.185 | 0.185 |
| 8.00 | 0.176 | 0.181 |
| 9.00 | 0.169 | 0.178 |
| 10.00 | 0.160 | 0.171 |

Figure 4:
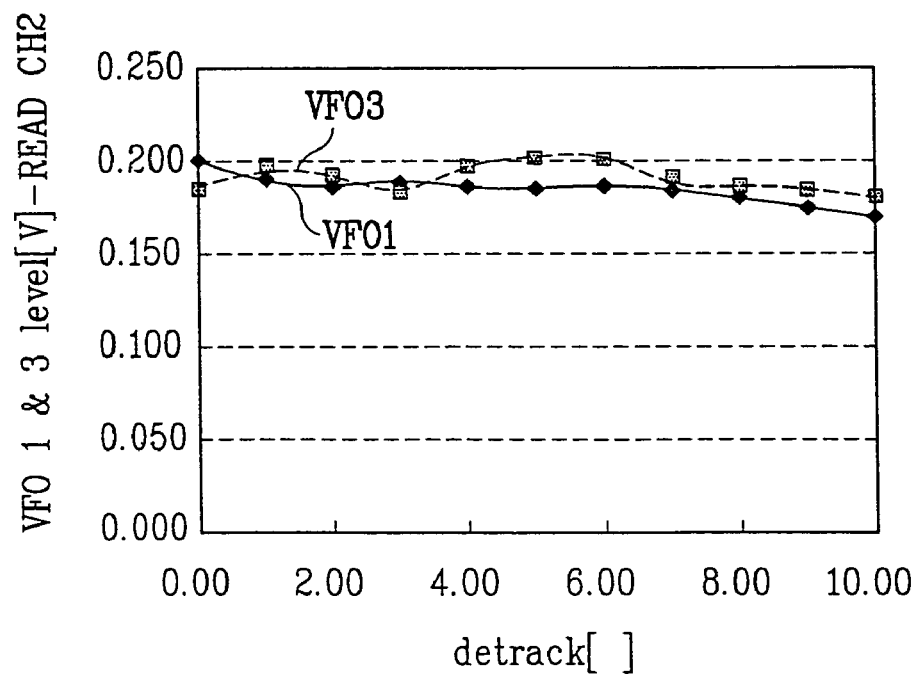
FIG. 4 is an exemplary graph showing read channel 2 signals detected at VFO1 and VFO3 areas in the header field depending on variation of a detrack offset.

FIG. 4 is a graph illustrating Table 1, in which the two signals are almost constant in level (VFO1−VFO3≈0).

That is, the signal levels are constant within the range of $V_{k-} \leq VFO1+VFO3 \leq V_{k+}$ irrespective of detrack, for example, while moving the track sector.

Figure 5A:
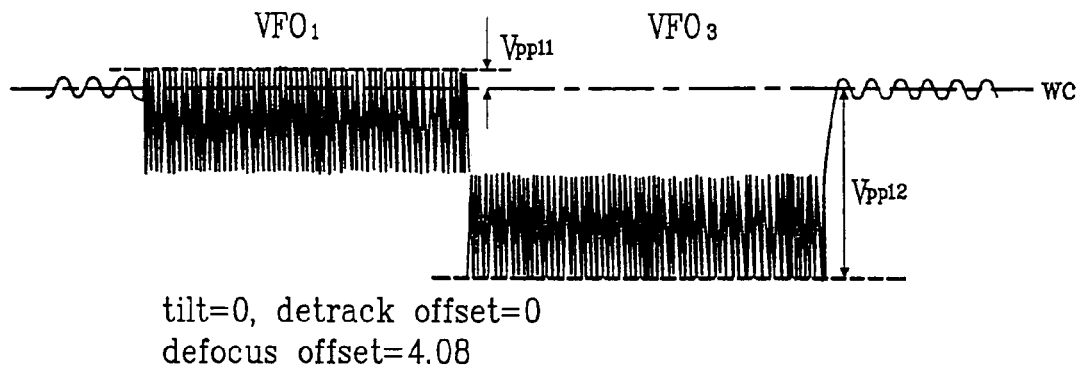
FIGS. 5a-5c are exemplary diagrams showing the potential relationship between the channel 2 signals shown in FIG. 4 and a wobble signal.
Figure 5B:
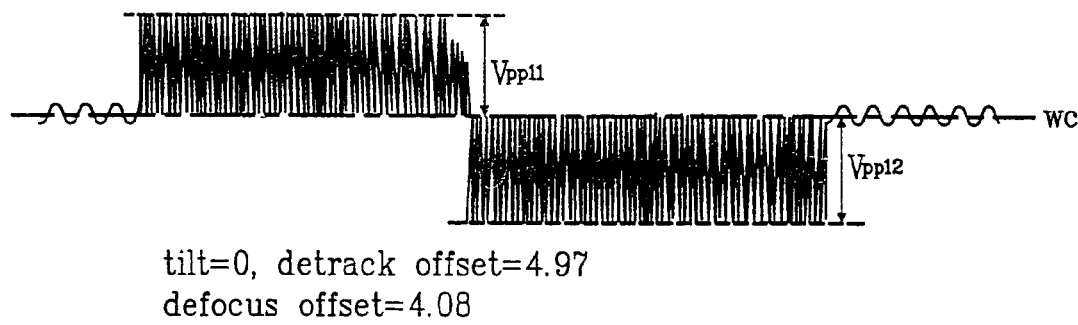
Figure 5C:
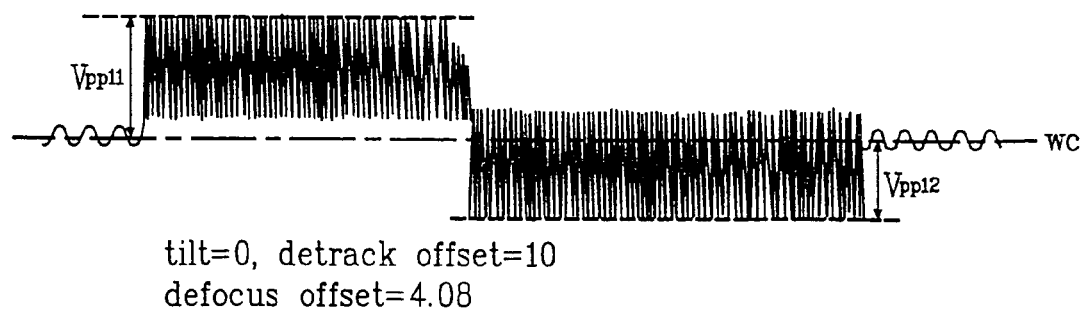

As shown in FIGS. 5a-5c, the center of the wobble signal (hereinafter, referred to as "wobble center") shifts up/down due to variation of the detrack offset.

Thus the quantity (=magnitude) and the direction of the detrack can be determined from comparison of the potential difference between the wobble center of the read channel 2 and the VFO1 signal (VFO1 potential−wobble center potential=Vpp11) with the potential difference between the wobble center and the VFO3 signal (VFO3 potential−wobble center potential=Vpp12).

That is, FIGS. 5a-5c are exemplary diagrams showing read channel 2 signals detected under variation of the detrack offset with the focus and tracking on when tilt is zero (=mechanism 0). Referring to FIGS. 5a-5c, the signal on the above and left side is the read channel 2 signal detected at the VFO area of the header 1,2 field and, in the inverse phase, the signal on the below and right side is the read channel 2 signal detected at the VFO area of the header 3,4 field.

In the present invention, the wobble center shifts depending on the detrack offset and thereby a voltage $V_{WC}$ detected at the wobble center changes. Thus the voltages detected at VFO1 and VFO3 are used as reference levels.

In a case where there is no detrack, i.e., the beam is correctly focused on the track center, the potential difference between the wobble center and the VFO1 signal (Vpp11=$V_{VFO1}$−$V_{WC}$) is almost equal to the potential difference between the wobble center and the VFO3 signal (Vpp12=$V_{VFO3}$−$V_{WC}$), as shown in FIG. 5b.

This can be expressed by Equation 1.

$$V_{VFO1}-V_{WC} \approx V_{VFO3}-V_{WC}$$ [Equation 1]

The value VVFO1 (or VVFO3) is determined while holding the peak and the bottom of the VFO1 (or VFO3) signal and then comparing it with the voltage of the wobble center. Alternatively, the value VVFO1 (or VVFO3) is determined while holding the center of the VFO1 (or VFO3) signal and then comparing it with the voltage of the wobble center.

According to the present invention, if the potential difference Vpp11 between the VFO1 signal and the wobble center is not equal to the potential difference Vpp12 between the VFO2 signal and the wobble center, i.e., the absolute value of the difference between the two potential differences (=Vpp11−Vpp12) exceeds a threshold $V_{Th1}$, it is determined that detrack has occurred; otherwise, the beam is determined as correctly focused on the track center, that is, "on track".

$$|Vpp11-Vpp12| \leq V_{Th1}$$ [Equation 2]

As the values of the read channel 2 signals detected at the header 1,2 field and the header 3,4 field are variable depending on the disc, the ratio of the two signals is normalized as expressed by Equation 3.

$$\left| \frac{Vpp11-Vpp12}{Vpp11+Vpp12} \right| \leq V_{Th1}$$ [Equation 3]

In a case where it is determined that detrack has occurred as the absolute value of the difference between the two potentials Vpp11 and Vpp12 is larger than the threshold VTh1, the magnitude and the direction of detrack are detected from the absolute value and the sign of the potential difference, respectively.

That is, when the value (=Vpp11−Vpp12) is ΔV1 and the absolute value of ΔV1 is greater than the threshold $V_{Th1}$, the magnitude and the direction of detrack can be known from the value and the sign of ΔV1, respectively.

If the sign of ΔV1 is negative (−), detrack is to be compensated by ΔV1 in the positive (+) direction; otherwise, if the sign of ΔV1 is positive (+), detrack is to be compensated by ΔV1 in the negative (−) direction. Therefore, compensation for detrack has to be performed in such a direction as to equalize the two potential differences Vpp11 and Vpp12.

In connection with this, the detrack detector 204 outputs to the servo controller 207 detrack error signals indicating the magnitude and the direction of detrack, which correspond to the absolute value and the sign of ΔV1, respectively. The servo controller 207 converts the detrack error signals to a tracking driving signal and outputs the tracking driving signal to the tracking driver 208.

The tracking driver 208 drives a tracking actuator in the optical pickup 202 based on the tracking driving signal, i.e., moves the optical pickup 202 by the magnitude of detrack in the positive (+) or negative (−) direction such that the optical pickup 202 lies in accord with the track center line of the optical disc 201.

Figure 6:
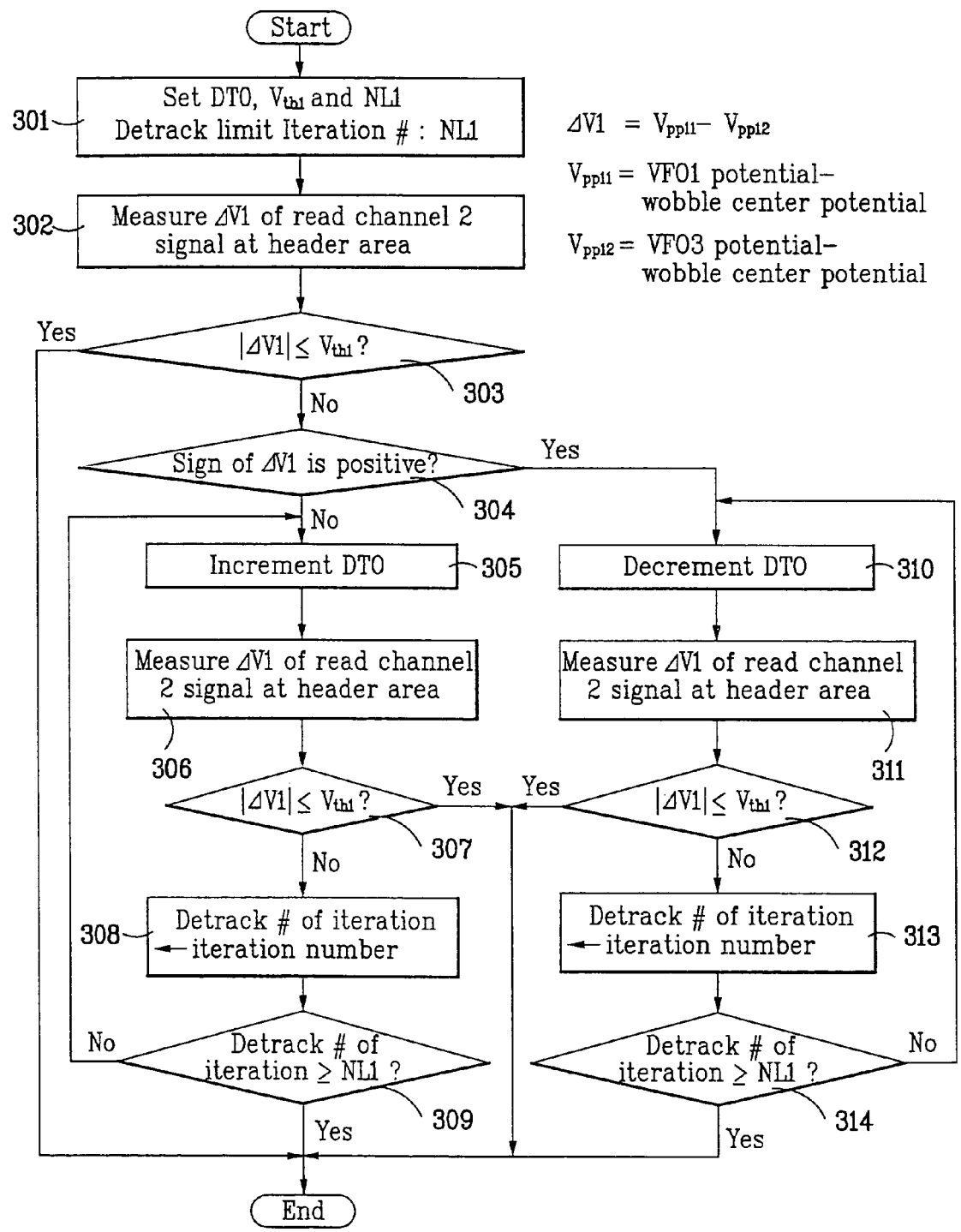
FIG. 6 is a flowchart of a detrack detecting and compensating procedure using read channel 2 signals of the header field in accordance with the present invention.

FIG. 6 is a flowchart of the above procedure.

Referring to FIG. 6, the step 301 sets an initial detrack offset DT0, a threshold $V_{Th1}$ and a detrack limit iteration number NL1. The step 302 measures Vpp11 and Vpp12 at detrack offset DT0, then calculating the difference between Vpp11 and Vpp12, i.e., ΔV1 (=Vpp11−Vpp12). The step 303 determines whether the absolute value of ΔV1 exceeds the threshold $V_{Th1}$ preset in the step 301. The reason for using the absolute value of ΔV1 lies in that ΔV1 can be a positive (+) or negative (−) value. If the absolute value of ΔV1 is smaller than or equal to the threshold $V_{Th1}$ in the step 303, which means that no detrack occurs, i.e., the beam is correctly focused on the track center, the routine is terminated; otherwise, if the absolute value of ΔV1 is larger than the threshold $V_{Th1}$, which means that detrack occurs, the step 304 determines the direction of detrack from a judgment of whether the sign of ΔV1 is positive (+) or negative (−). With negative (−) sign of ΔV1, the step 305 increments the detrack offset DT0; otherwise, with positive (+) sign of ΔV1, the step 306 measures again the variation ΔV1 of the read channel 2 signals detected at the header field. Thereafter, the step 307 compares the absolute value of the variation ΔV1 with the threshold $V_{Th1}$. If the absolute value of ΔV1 is smaller than or equal to the threshold $V_{Th1}$, the routine is terminated; otherwise, if the absolute value of ΔV1 is larger than the threshold $V_{Th1}$, which means that detrack is not completely compensated, the procedure proceeds to the step 308. The step 308 applies the current loop iteration number to the detrack iteration number and the step 309 compares the detrack iteration number with the preset detrack limit iteration number NL1.

If the detrack iteration number is larger than or equal to the preset detrack limit iteration number NL1, the routine terminates; otherwise, the procedure returns to the step 305.

This comparison of the detrack iteration number with the detrack limit iteration number is to prevent a possible case where the variation ΔV1 exceeds the threshold $V_{Th1}$, i.e., no convergence occurs. In such a case, the routine provides an unlimited loop, resets the detrack limit iteration number and compares the detrack limit iteration number with the detrack iteration number.

Meanwhile, if the step 304 determines that the sign of ΔV1 is positive (+), the detrack offset DT0 is decremented in step 310 and the variation ΔV1 of the read channel 2 signals detected at the header field is measured again in step 311. The step 312 compares the absolute value of the variation ΔV1 with the threshold $V_{Th1}$. If the absolute value of ΔV1 is smaller than or equal to the threshold $V_{Th1}$, the routine is terminated; otherwise, if the absolute value of ΔV1 is larger than the threshold $V_{Th1}$, which means that detrack is not completely compensated, the procedure proceeds to the step 313. The step 313 applies the current loop iteration number to the detrack iteration number and the step 314 compares the detrack iteration number with the preset detrack limit iteration number NL1. If the detrack iteration number is larger than or equal to the detrack limit iteration number, the routine terminates; otherwise, the procedure returns to the step 310.

2) Using tracking error signal

The present invention detects detrack using a level difference between tracking channel 2 signals detected at the header 1,2 field and the header 3,4 field staggered with respect to each other and a reference signal. The reference signal level is the center level of the tracking error signal detected at a user area.

For this, the tracking error (TE) signals among the servo error signals detected at the RF and servo error generator 203 are input to the detrack detector 204. The TE signals can be obtained by filtering the read channel 2 signals, for example, using a low-pass filter.

After sampling the tracking error signals output from the header 1,2 field and the header 3,4 field, the detrack detector 204 detects the level difference between the tracking error signals and the reference signal Table 2 shows the tracking error signal levels under best conditions for generating the servo error signals while controlling defocus and detrack in a state of tilt zero (i.e., mechanism 0), in which the tracking error signal levels vary depending on variation of the detrack offset at fixed tilt and defocus offsets.

TABLE 2

| Detrack Offset [ ] | Header 1,2 [V] | Header 3,4 [V] |
| --- | --- | --- |
| 0.00 | 4.90 | 0.50 |
| 1.00 | 4.30 | 1.30 |
| 2.00 | 4.10 | 1.50 |
| 3.00 | 3.70 | 2.10 |
| 4.00 | 3.20 | 2.50 |
| 5.00 | 2.50 | 3.10 |
| 6.00 | 1.70 | 4.00 |
| 7.00 | 0.80 | 4.30 |
| 8.00 | 0.20 | 4.80 |
| 9.00 | 0.00 | 4.90 |
| 10.00 | −1.10 | 5.50 |

Figure 7:
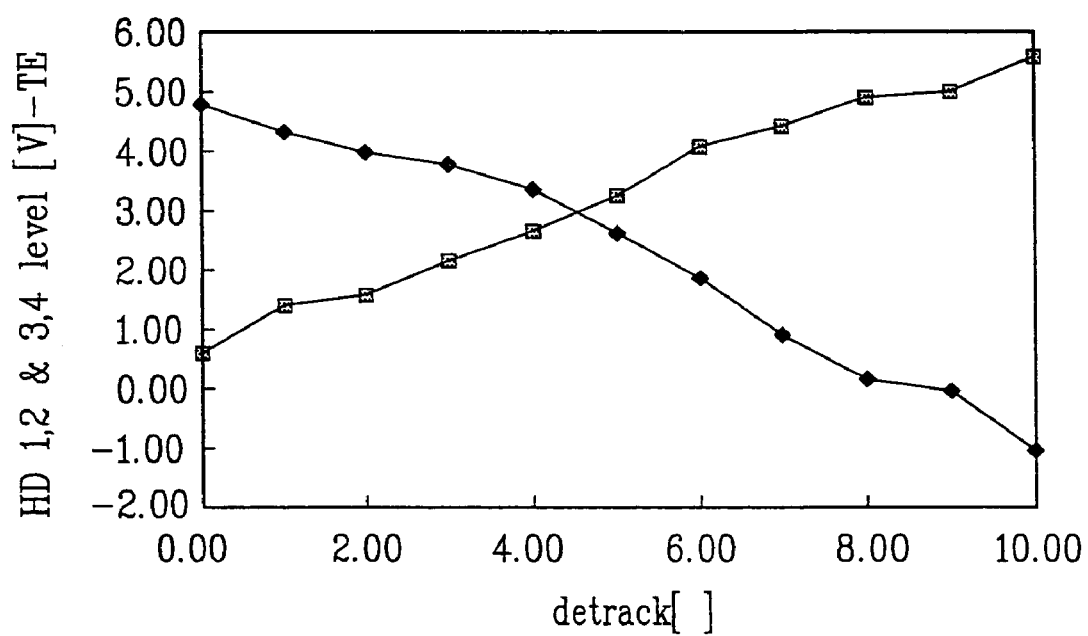
FIG. 7 is an exemplary graph showing tracking error signals detected at a header 1,2 field and a header 3,4 field depending on variation of a detrack offset.

FIG. 7 is a graph illustrating Table 2, in which no detrack is detected when the potential difference between the tracking error signal detected at the header 1,2 field and the reference signal is in symmetric relation with the potential difference between the tracking error signal detected at the header 3,4 field and the reference signal.

That is, the tracking error signals are significantly shifted up and down in the header field. For tracking error signals detected at the user area on which data is actually written, the two potential differences are almost equal to each other when no detrack occurs, i.e., the beam is focused on the track center, whereas they are not equal to each other when detrack occurs, i.e., the beam passes through the header 1,2 field and the header 3,4 field.

Thus whether or not detrack has occurred can be determined by comparing the potential difference between the tracking error signal at the header 1,2 field and the reference signal (tracking error signal potential at header 1,2 field–reference potential=Vp11) with the potential difference between the tracking error signal at the header 3,4 field and the reference signal (tracking error signal potential at header 3,4 field–reference potential=Vp12).

Figure 8A:
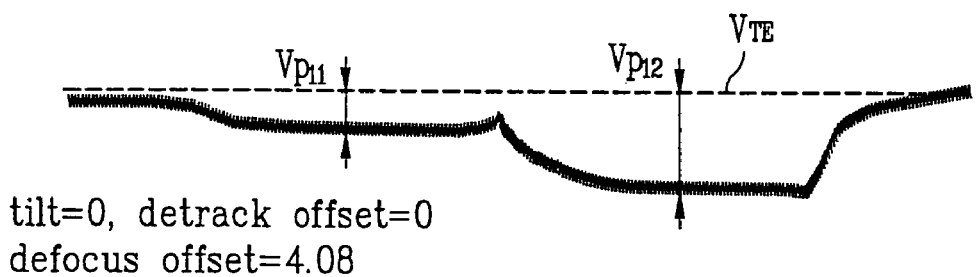
FIGS. 8a-8c are exemplary diagrams showing the level variation of tracking error signals detected at a header 1,2 field and a header 3,4 field depending on variation of a detrack offset.
Figure 8B:
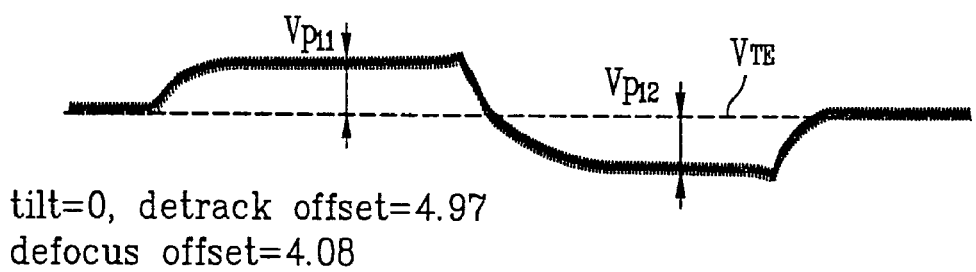
Figure 8C:
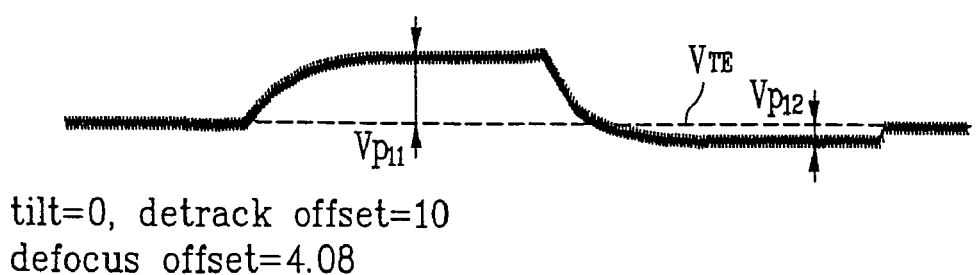

FIGS. 8a-8c are exemplary diagrams showing tracking error signals varying depending on variation of the detrack offset with tracking and focus on at tilt=0.

Referring FIGS. 8a-8c, the left-hand signal is the tracking error signal $V_{HD12}$ detected at the header 1,2 field, the right-hand signal being the tracking error signal $V_{HD34}$. A voltage $V_{TE}$ detected at the center level of the tracking error signal at the user area is preferably the voltage of the reference level.

In a case where no detrack occurs, the potential difference between the tracking error signal at the header 1,2 field and the reference level (Vp11=|$V_{HD12}$-$V_{TE}$|) is almost equal to the potential difference between the tracking error signal at the header 3,4 field and the reference level (Vp12=|$V_{HD34}$-$V_{TE}$|), as shown in FIG. 8b. That is, the potential difference Vp11=|$V_{HD12}$-$V_{TE}$| is in symmetric relation with the potential difference Vp12=|$V_{HD34}$-$V_{TE}$|.

This can be expressed by Equation 4.

$$|V_{HD12} - V_{TE}| \approx |V_{HD34} - V_{TE}| \quad \text{[Equation 4]}$$

It is determined that no detrack has occurred, when the potential difference Vp11 between the tracking error signal at the header 1,2 field and the reference level is not equal to the potential difference Vp12 between the tracking error signal at the header 3,4 field and the reference level, as shown in FIGS. 8a and 8c, i.e., the potential difference Vp11 is in asymmetric relation with to the potential difference Vp12. The asymmetry increases with greater magnitude of detrack.

The can be expressed by Equation 5.

$$|V_{HD12} - V_{TE}| \neq |V_{HD34} - V_{TE}| \quad \text{[Equation 5]}$$

It is determined that detrack occurs, when the potential difference between the tracking error signal at the header 1,2 field and the reference level (Vp11=|$V_{HD12}$-$V_{TE}$|) is not equal to the potential difference between the tracking error signal at the header 3,4 field and the reference level (Vp12=|$V_{HD34}$-$V_{TE}$|), i.e., the absolute value of the difference between the two potentials (=Vp11-Vp12) exceeds a threshold $V_{Th2}$. Otherwise, as expressed by Equation 6, it is determined as "on-track" where the beam is correctly focused on the track center.

$$|Vp11 - Vp12| \leq V_{Th2} \quad \text{[Equation 6]}$$

As such, after calculation of the potential difference Vp11 between the tracking error signal at the header 1,2 field and the reference level, and the potential difference Vp12 between the tracking error signal at the header 3,4 field and the reference level, the difference between the two potential differences Vp11 and Vp12 is compared with the threshold, as a result of which the magnitude and the direction of detrack are detected.

When the difference between the two potential differences (Vp11-Vp12) is ΔV2, the absolute value of ΔV2 indicates the magnitude of detrack, the sign of ΔV2 indicating the direction of detrack. That is, it is detected in which direction the optical disc is deflected from the track center with respect to a normal state.

If the sign of ΔV2 is negative (−), detrack is to be compensated by ΔV1 in the positive (+) direction; otherwise, if the sign of ΔV2 is positive (+), detrack is to be compensated by ΔV2 in the negative (−) direction. That is, compensation for detrack has to be performed in such a direction as to equalize the two potential differences Vp11 and Vp12, i.e., the value ΔV2 becomes zero.

Because the values of the tracking error signals detected at the header 1,2 field and the header 3,4 field are variable depending on the disc, the ratio of the two signals is normalized as expressed by Equation 7.

$$\left| \frac{Vp11 - Vp12}{Vp11 + Vp12} \right| < V_{Th2} \quad \text{[Equation 7]}$$

That is, if the Equation 7 is satisfied, it is determined that no detrack has occurred, otherwise, it means that detrack has occurred, after which the magnitude and the direction of detrack are detected from the absolute value and the sign of (Vp11-Vp12), respectively.

In connection with this, the detrack detector 204 calculates ΔV2 in the above-described manner and outputs to the servo controller 207 detrack error signals indicating the magnitude and the direction of detrack, which correspond to the absolute value and the sign of ΔV2, respectively. The servo controller 207 converts the detrack error signals to a tracking driving signal and outputs the tracking driving signal to the tracking driver 208. That is, the servo controller 207 generates a tracking driving signal such that the potential difference between the tracking error signal at the header 1,2 field and the reference level (Vp11=|$V_{HD12}$-$V_{TE}$|) is in symmetric relation with the potential difference between the tracking error signal at the header 3,4 field and the reference level (Vp12=|$V_{HD34}$-$V_{TE}$|), and outputs the tracking driving signal to the tracking driver 208.

The tracking driver 208 moves a tracking actuator in the optical pickup 202 based on the tracking error signal, i.e., by the magnitude of detrack in the positive (+) or negative (−) direction such that the optical pickup 202 lies in accord with the track center line of the optical disc 201.

Figure 9:
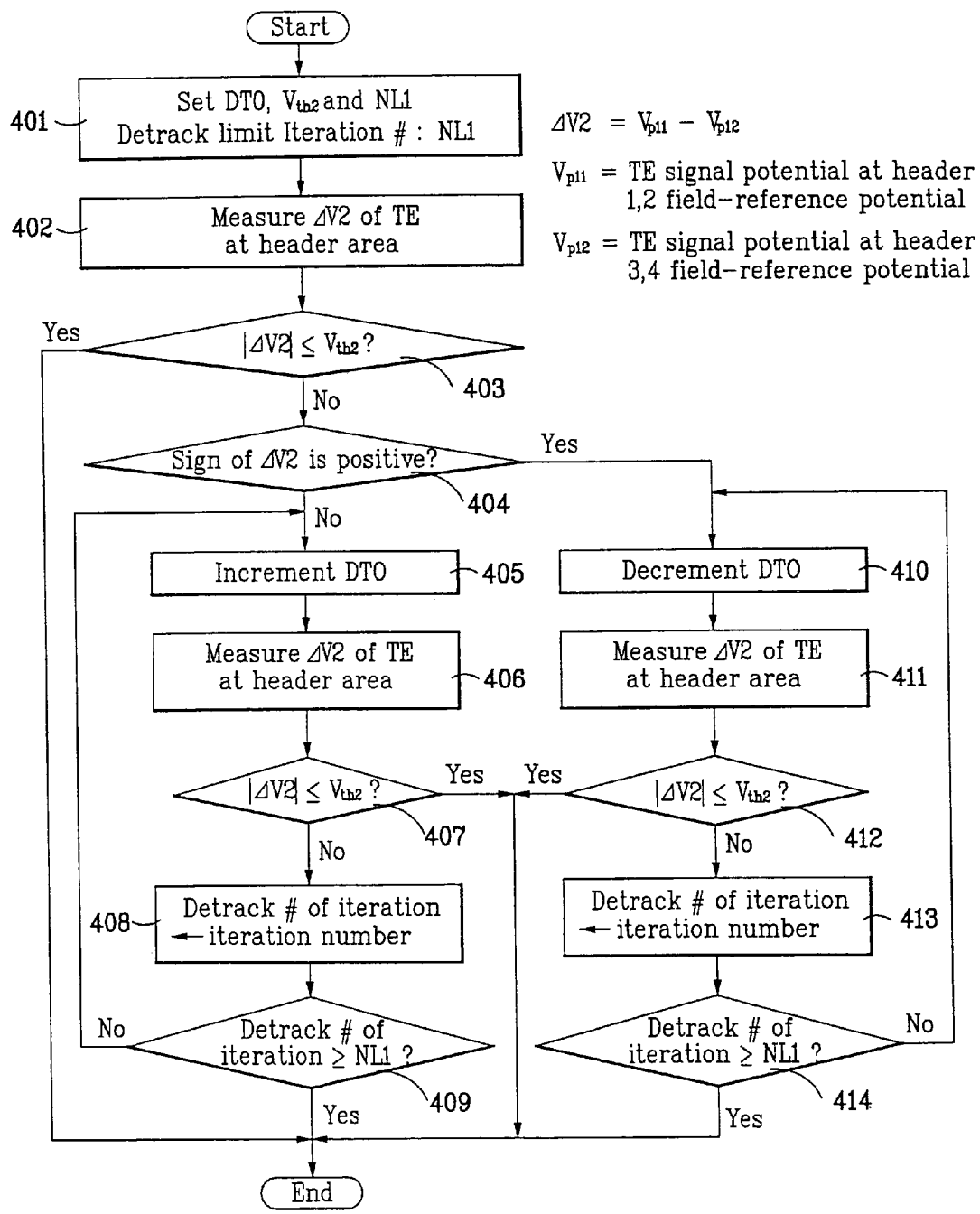
FIG. 9 is a flowchart of a detrack detecting and compensating procedure using tracking error signals of the header field in accordance with the present invention.

FIG. 9 is a flowchart of the above procedure.

Referring to FIG. 9, the step 401 sets an initial detrack offset DT0, a threshold $V_{Th2}$ and a detrack limit iteration number NL1.

The step 402 measures Vp11 and Vp12 at detrack offset DT0, then calculating the difference between Vp11 and Vp12, i.e., ΔV2 (=Vp11-Vp12). The step 403 determines whether the absolute value of ΔV2 exceeds the threshold $V_{Th2}$ preset in the step 401. If the absolute value of ΔV2 is smaller than or equal to the threshold $V_{Th2}$ in the step 403, which means "on-track", i.e., the beam is correctly focused on the track center, the routine is terminated; otherwise, if the absolute value of ΔV2 is larger than the threshold $V_{Th2}$, which means that detrack occurs, the step 404 determines the direction of detrack from a judgment of whether the sign of ΔV2 is positive (+) or negative (−). With the negative (−) sign of ΔV2, the step 405 increments the detrack offset DT0 and the step 406 measures again the variation ΔV2 of the tracking error signals detected at the header 1,2 field and the header 3,4 field. Then, the step 407 compares the absolute value of the variation ΔV2 with the threshold $V_{Th2}$. If the absolute value of ΔV2 is smaller than or equal to the threshold $V_{Th2}$, the routine is terminated; otherwise, if the absolute value of ΔV2 is larger than the threshold $V_{Th2}$, which means that detrack is not completely compensated, the procedure proceeds to the step 408. The step 408 applies the current loop iteration number to the detrack iteration number and the step 409 compares the detrack iteration number with the preset detrack limit iteration number NL1.

If the detrack iteration number is larger than or equal to the preset detrack limit iteration number NL1, the routine terminates; otherwise, the procedure returns to the step 405.

Meanwhile, if the sign of ΔV2 is positive (+) in step 404, the step 410 decrements detrack offset DT0 and the above process is repeated in steps 411 to 414.

The present invention presets the thresholds and reduces time required for detecting and compensating detrack during the actual data write operation, thereby enabling a real time write operation through rapid stabilization of tracking servo.

Tilt Detection and Compensation
Using read channel 2 signal

The track center value is best detected from wobble signals, since the wobble signals are formed regularly along the track boundary during fabrication of the disc and tilt does not affect the center of the wobble signals.

Thus the present invention detects tilt using a level difference between VFO1 and VFO3 signals at the header field of read channel 2 and the track center.

For this, among error signals detected at the RF and servo error generator 203, read channel 2 signals are input to the tilt detector 205.

The levels of read channel 2 signals detected at VFO1 and VFO3 areas appear negligible due to variation of tilt with focus and tracking on, as shown in Table 3.

TABLE 3

| Radial Tilt [°] | VFO1 [V] | VFO3 [V] |
|---|---|---|
| −1.0 | 0.201 | 0.178 |
| −0.8 | 0.215 | 0.183 |
| −0.6 | 0.210 | 0.187 |
| −0.4 | 0.197 | 0.187 |
| −0.2 | 0.197 | 0.201 |
| 0.0 | 0.192 | 0.206 |
| 0.2 | 0.210 | 0.178 |
| 0.4 | 0.151 | 0.224 |
| 0.6 | 0.127 | 0.219 |
| 0.8 | 0.110 | 0.215 |
| 1.0 | 0.114 | 0.197 |

Figure 10:
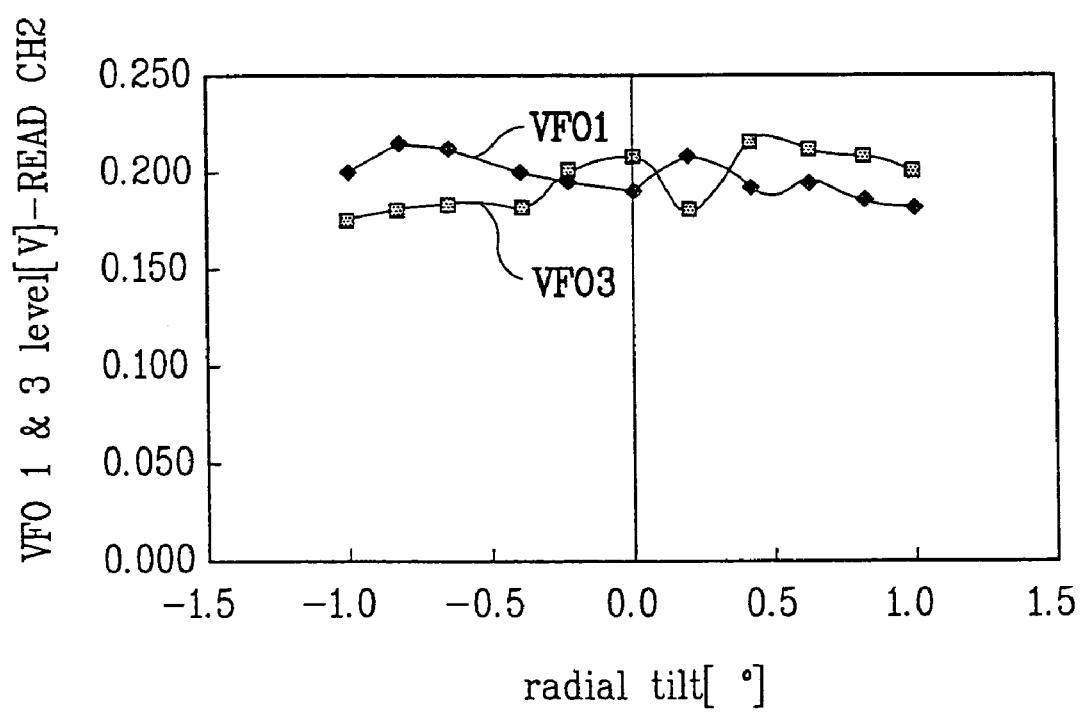
FIG. 10 is an exemplary graph showing read channel 2 signals detected at VFO1 and VFO3 areas in the header field depending on variation of tilt.

FIG. 10 is a graph illustrating Table 3, in which the two signals are almost constant in level (VFO1−VFO3≈0).

That is, the signal levels are constant within the range of $V_{k-} \leq VFO1+VFO3 \leq V_{k+}$ irrespective of tilt.

Figure 11A:
FIGS. 11a-11c are exemplary diagrams showing the potential relationship between the channel 2 signals shown in FIG. 10 and a track center.
Figure 11B:
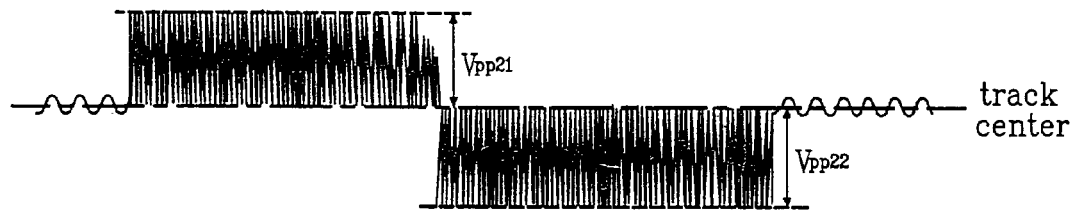
Figure 11C:
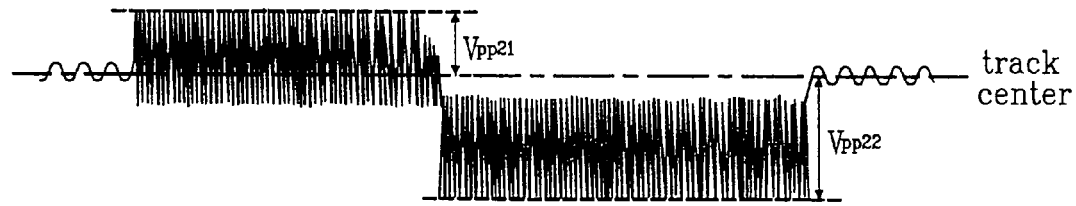

As shown in FIGS. 11a-11c, the VFO1 and VFO3 signals are shifted above/below the track center due to variation of tilt. However, tilt does not affect the track center.

Thus the quantity (=magnitude) and the direction of the tilt can be detected from comparison of the potential difference between the track center and the VFO1 signal of read channel 2 (VFO1 potential−track center potential=Vpp21) with the potential difference between the track center and the VFO3 signal of read channel 2 (VFO3 potential−track center potential=Vpp22).

That is, FIGS. 11a-11c are exemplary diagrams showing read channel 2 signals detected under variation of tilt with the focus and tracking on. Referring to FIGS. 11a-11c, the left-hand signal is the read channel 2 signal detected at the VFO1 area of the header field and the right-hand signal is the read channel 2 signal detected at the VFO3 area of the header field. The voltage $V_{WC}$ detected at the track center is the reference voltage.

In a case where tilt is zero, i.e., there is no radial tilt, the potential difference between the track center and the VFO1 signal (Vpp21=$V_{VFO1}$−$V_{WC}$) is almost equal to the potential difference between the track center and the VFO3 signal (Vpp22=$V_{VFO3}$−$V_{WC}$), as shown in FIG. 11b. This means, the potential difference Vpp21 is in symmetric relation with the potential difference Vpp22.

This can be expressed by Equation 8.

$$V_{VFO1} - V_{WC} \approx V_{VFO3} V_{WC} \qquad \text{[Equation 8]}$$

The value $V_{VFO1}$ (or $V_{VFO3}$) is determined while holding the peak and the bottom of the VFO1 (or VFO3) signal and then compared with the voltage of the track center. Alternatively, The value $V_{VFO1}$ (or $V_{VFO3}$) is determined while holding the center of the VFO1 (or VFO3) signal and then compared with the voltage of the track center.

If the potential difference Vpp21 between the VFO1 signal and the track center is not equal to the potential difference Vpp22 between the VFO2 signal and the track center, i.e., Vpp21 is in asymmetric relation with Vpp22, it means that tilt occurs.

For example, as shown in FIG. 11a, when $V_{VFO1}$−$V_{WC}$>$V_{VFO3}$−$V_{WC}$, i.e., Vpp21>Vpp22, it means that tilt of about 1° occurs; and as shown in FIG. 11c, when $V_{VFO1}$−$V_{WC}$<$V_{VFO3}$−$V_{WC}$, i.e., Vpp21<Vpp22, it means that tilt of about −1° occurs As such, the magnitude and the direction of tilt can be detected from calculation of the potential difference Vpp21 between the track center and the VFO1 signal and the potential difference Vpp22 between the track center and the VFO2 signal, and comparison of the two potential differences.

When the value (=Vpp21−Vpp22) is ΔV3 and the absolute value of ΔV3, the magnitude and the direction of tilt are detected from the value and the sign of ΔV3, respectively. That is, it can be known whether the disc is bending up or down with respect to a normal state.

If the sign of ΔV3 is negative (−), tilt is to be compensated by ΔV3 in the positive (+) direction; otherwise, if the sign of ΔV3 is positive (+), tilt is to be compensated by ΔV3 in the negative (−) direction. Therefore, compensation for tilt has to be performed in such a direction as to equalize the two potential differences Vpp21 and Vpp22.

In connection with this, the tilt detector 205 outputs to the servo controller 207 tilt error signals indicating the magnitude and the direction of tilt, which correspond to the absolute value and the sign of ΔV3, respectively. The servo controller 207 converts the tilt error signals to a tilt driving signal and outputs the tilt driving signal to the tilt driver 209.

The tilt driver 209 moves the disc or the optical pickup for direct control of tilt based on the tilt driving signal, i.e., by the magnitude of tilt in the positive (+) or negative (−) direction.

Figure 12:
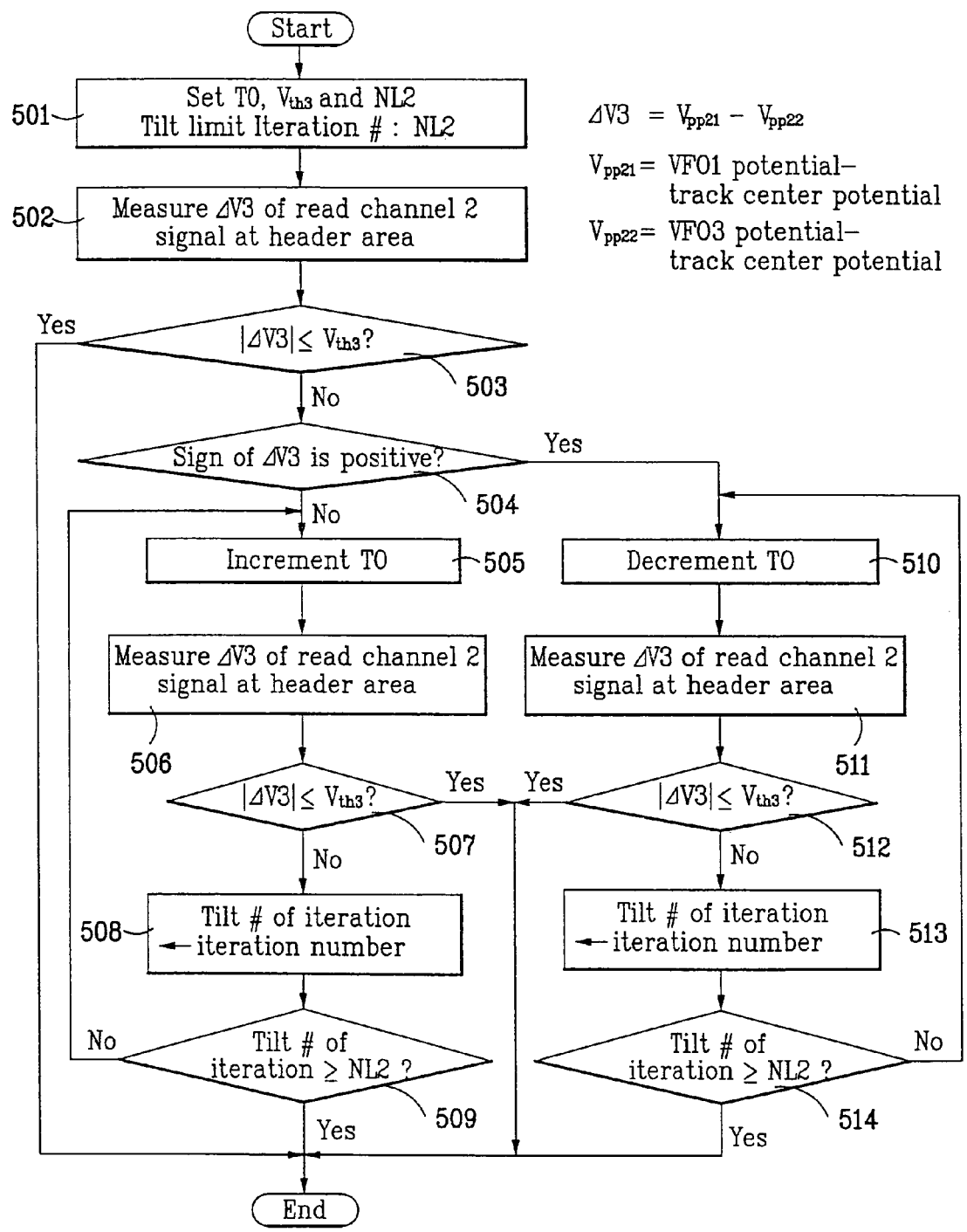
FIG. 12 is a flowchart of a tilt detecting and compensating procedure using read channel 2 signals of the header field in accordance with the present invention.

FIG. 12 is a flowchart of the above procedure.

Referring to FIG. 12, the step 501 sets an initial tilt offset T0, a threshold $V_{Th3}$ and a tilt limit iteration number NL2. The step 502 measures Vpp21 and Vpp22 at tilt offset T0, then calculating the difference between Vpp21 and Vpp22, i.e., ΔV3 (=Vpp21−Vpp22). The step 503 determines whether the absolute value of ΔV3 exceeds the threshold $V_{Th3}$ preset in the step 501. If the absolute value of ΔV3 is smaller than or equal to the threshold $V_{Th3}$ in the step 503, which means that no tilt occurs, the routine is terminated; otherwise, if the absolute value of ΔV3 is larger than the threshold $V_{Th3}$, which means that tilt occurs, the step 504 determines the direction of tilt from a judgment of whether the sign of ΔV3 is positive (+) or negative (−).

With negative (−) sign of ΔV3, the step 505 increments the tilt offset T0 and the step 506 measures again the variation ΔV3 of the read channel 2 signals detected at the VFO1 and VFO3 areas in the header field. Then, the step 507 compares the absolute value of the variation ΔV3 with the threshold $V_{Th3}$. If the absolute value of ΔV3 is smaller than or equal to the threshold $V_{Th3}$, the routine is terminated; otherwise, if the absolute value of ΔV3 is larger than the threshold $V_{Th3}$, which means that tilt is not completely compensated, the procedure proceeds to the step 508. The step 508 applies the current loop iteration number to the tilt iteration number and the step 509 compares the tilt iteration number with the preset tilt limit iteration number NL2. If the tilt iteration number is larger than or equal to the preset tilt limit iteration number NL2, the routine terminates; otherwise, the procedure returns to the step 505.

Meanwhile, if the step 504 determines that the sign of ΔV3 is positive (+), the tilt offset T0 is decremented in step 510 and the above process is repeated in steps 511 to 514. The determination and comparison process for the tilt limit iteration number NL2 is the same in reason as the previously described process for the detrack limit iteration number NL1.

The present invention can detect the magnitude and the direction of tilt by using a ground level (also, called "initial level") rather than the track center as the reference value for detecting tilt.

For this, the present invention can use either one of VFO1 and VFO3 signals of read channel 2 in the header field as well as both of them. Also, the present invention can use a voltage $V_{BOT1}$ or $V_{BOT2}$ while holding the bottom of read channel 2 signals in the header field, or a voltage $V_{TOP1}$ or $V_{TOP2}$ while holding the top of the read channel 2 signals.

For example, it is supposed that use is made of a read channel 2 signal at the VFO1 area in the header field, particularly, a voltage obtained by holding the top of the read channel 2 signal at the VFO1 area.

First, a potential difference $V_{TOP1}$ is measured between the ground potential when no tilt occurs and the top signal of the read channel 2 signal at the VFO1 area. If the potential difference $V_{TOP1}$ is measured when no tilt occurs, as shown in FIG. 13b, tilt is detected with the potential difference used as a preset threshold.

That is, if the potential difference between the ground potential and the top signal of the read channel 2 signal at the VFO1 is not equal to the potential difference measured when no tilt occurs, it means that tilt has occurred.

Figure 13A:
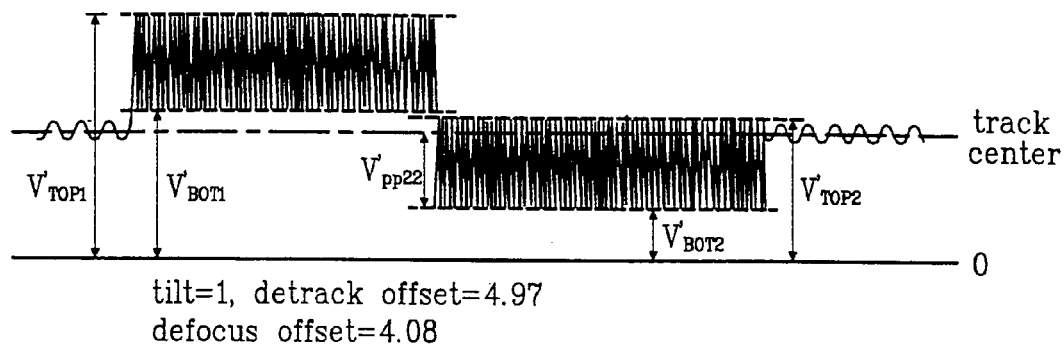
FIGS. 13a-13c are exemplary diagrams showing the relationship between the read channel 2 signals detected at VFO1 and VFO3 areas in the header field and a ground level, depending on variation of tilt.
Figure 13B:
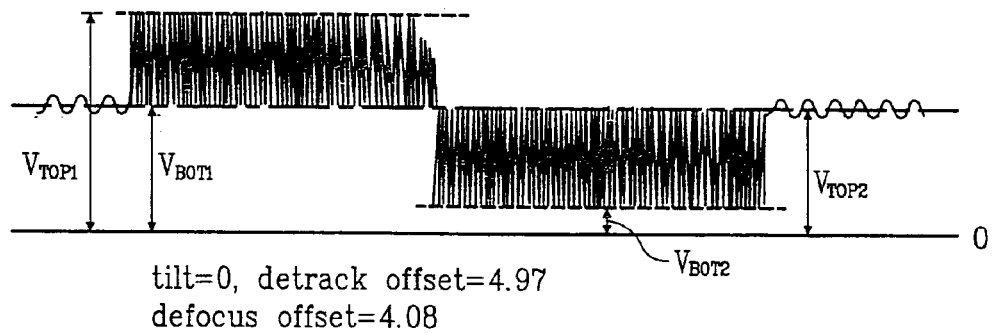
Figure 13C:
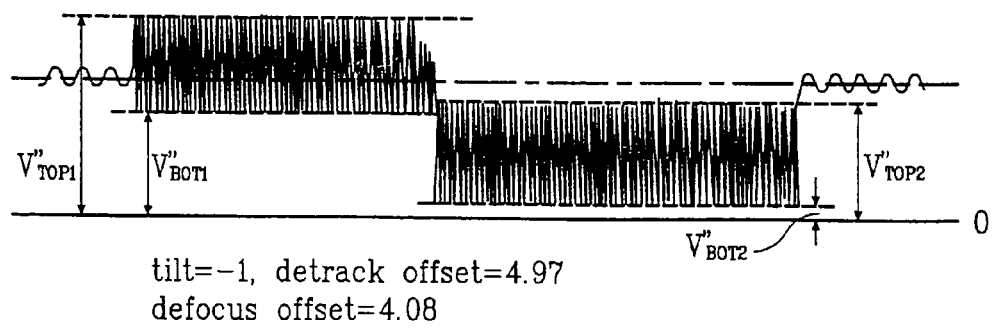

It is determined that tilt has occurred, for example, if the potential difference $V'_{TOP1}$ between the ground potential and the top signal of the read channel 2 signal at the VFO1 area is higher than the potential difference $V_{TOP1}$ measured when no tilt occurs, as shown in FIG. 13a, or if the potential difference $V''_{TOP1}$ between the ground potential and the top signal of the read channel 2 signal at the VFO1 area is lower than the potential difference $V_{TOP1}$ measured when no tilt occurs, as shown in FIG. 13c.

The direction of tilt can be known from the sign of the difference between the two potential differences. That is, the magnitude and the direction of tilt can be detected from the absolute value and the sign of the difference between the two potential differences.

For example, when $V_{TOP1}-V''_{TOP1}=+\Delta V3'$, which means that tilt has occurred by ΔV3', as shown in FIG. 13c, compensation for tilt has to be performed by ΔV3' in the negative (−) direction.

The present invention also uses the potential difference $V_{BOT1}$ as a reference value at the time when no tilt occurs and detects the magnitude and the direction of tilt using the relationship between the reference value and the potential difference between the ground potential and the bottom signal of the read channel 2 signal at the VFO1 area. Likewise, the present invention uses $V_{TOP2}$ and $V_{BOT2}$.

Such as in the present invention, during tilt or servo control, the quantity of tilt between the optical axis and the disc plane can be detected and controlled by any one of the above-stated methods.

2) Using tracking error signal

The present invention detects tilt using a level difference between tracking error signals detected at the header 1,2 field and the header 3,4 field staggered with respect to each other and a reference signal. The reference signal level is the center level of the tracking error signal detected at a user area.

For this, the tracking error (TE) signals among the servo error signals detected at the RF and servo error generator 203 are input to the tilt detector 205

After sampling the tracking error signals output from the header 1,2 field and the header 3,4 field, the tilt detector 205 detects the level difference between the tracking error signals and the reference signal Table 4 shows the tracking error signal levels detected while varying tilt at fixed detrack and defocus offsets with focus and tracking on.

TABLE 4

| Radial Tilt [°] | Header 1,2 [V] | Header 3,4 [V] |
|---|---|---|
| −1.0 | 0.70 | 3.30 |
| −0.8 | 1.00 | 3.50 |
| −0.6 | 1.50 | 3.50 |
| −0.4 | 1.80 | 3.70 |
| −0.2 | 2.20 | 3.40 |
| 0.0 | 2.20 | 3.10 |
| 0.2 | 2.40 | 3.10 |
| 0.4 | 2.40 | 2.90 |
| 0.6 | 2.40 | 2.60 |
| 0.8 | 2.20 | 2.40 |
| 1.0 | 2.10 | 1.80 |

Figure 14:
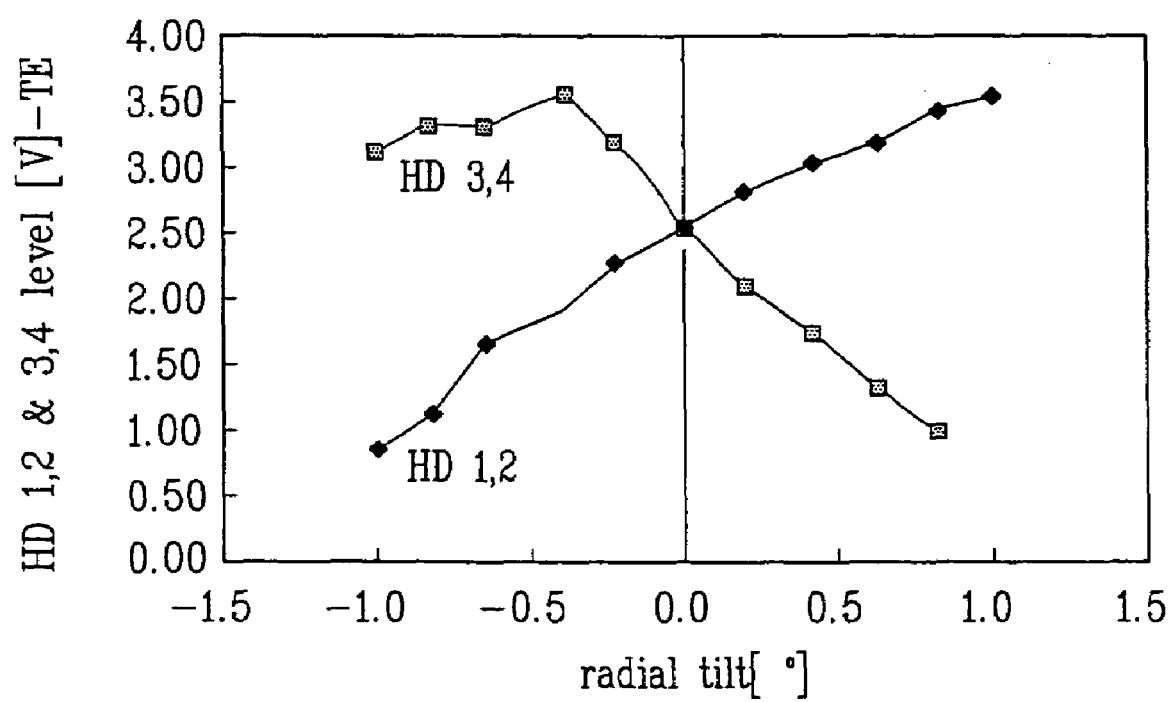
FIG. 14 is an exemplary graph showing tracking error signals detected at a header 1,2 field and a header 3,4 field depending on variation of tilt.

FIG. 14 is a graph illustrating Table 4, in which it means that no tilt has occurred when the potential difference between the tracking error signal detected at the header 1,2 field and the reference signal is in symmetric relation with the potential difference between the tracking error signal detected at the header 3,4 field and the reference signal.

That is, the tracking error signals are significantly shifted up and down in the header field. For tracking error signals detected at the user area on which data is actually written, the two potential differences are almost equal to each other when no tilt occurs, i.e., the beam is at the track center, whereas they are not equal to each other when tilt occurs, i.e., the beam passes through the header 1,2 field and the header 3,4 field.

Thus whether tilt has occurred or not can be determined by comparing the potential difference between the tracking error signal at the header 1,2 field and the reference signal (tracking error signal potential at header 1,2 field−reference potential=Vp21) with the potential difference between the tracking error signal at the header 3,4 field and the reference signal (tracking error signal potential at header 3,4 field−reference potential=Vp22).

Figure 15A:
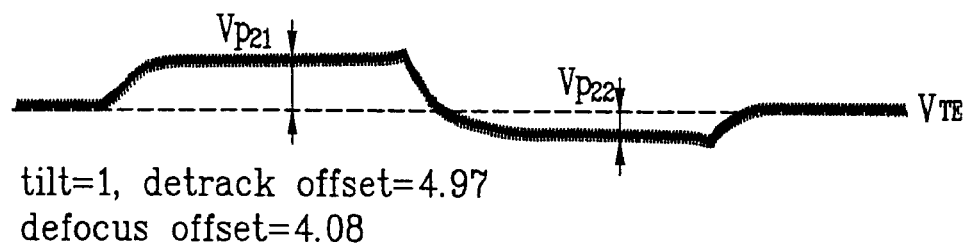
FIGS. 15a-15c are exemplary diagrams showing level variation of tracking error signals detected at a header 1,2 field and a header 3,4 field depending on variation of tilt.
Figure 15B:
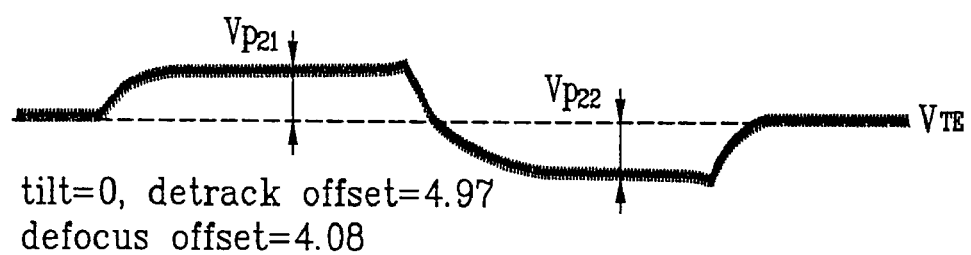
Figure 15C:
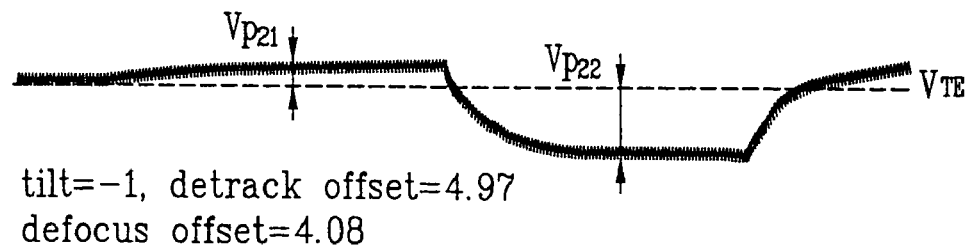

FIGS. 15a-15c are exemplary diagrams showing tracking error signals varying depending on variation of the tilt offset with tracking and focus on.

Referring FIGS. 15a-15c, the left-hand signal is the tracking error signal $V_{HD12}$ detected at the header 1,2 field, the right-hand signal being the tracking error signal $V_{HD34}$.

A voltage $V_{TE}$ detected at the center level of the tracking error signal at the user area is preferably the voltage of the reference level.

In a case where no tilt occurs, the potential difference between the tracking error signal at the header 1,2 field and the reference level ($Vp21=|V_{HD12}-V_{TE}|$) is almost equal to the potential difference between the tracking error signal at the header 3,4 field and the reference level ($Vp22=|V_{HD34}-V_{TE}|$), as shown in FIG. 15b. That is, the potential difference $Vp21=|V_{HD12}-V_{TE}|$ is in symmetric relation with the potential difference $Vp22=|V_{HD34}-V_{TE}|$.

This can be expressed by Equation 9.

$$|V_{HD12}-V_{TE}| \approx |V_{HD34}-V_{TE}| \quad \text{[Equation 9]}$$

It is determined that no tilt has occurred, when the potential difference Vp21 between the tracking error signal at the header 1,2 field and the reference level is not equal to the potential difference Vp22 between the tracking error signal at the header 3,4 field and the reference level, as shown in FIGS. 15a and 15c, i.e., the potential difference Vp21 is in asymmetric relation with to the potential difference Vp22. The asymmetry increases with greater magnitude of tilt.

The can be expressed by Equation 10.

$$|V_{HD12}-V_{TE}| \neq |V_{HD34}-V_{TE}| \quad \text{[Equation 10]}$$

It is determined that tilt has occurred, when the potential difference between the tracking error signal at the header 1,2 field and the reference level ($Vp21=|V_{HD12}-V_{TE}|$) is not equal to the potential difference between the tracking error signal at the header 3,4 field and the reference level ($Vp22=|V_{HD34}-V_{TE}|$), i.e., the absolute value of the difference between the two potentials (=Vp21−Vp22) exceeds a threshold $V_{Th4}$. Otherwise, as expressed by Equation 11, it is determined that no tilt has occurred.

$$|Vp21-Vp22| \leq V_{Th4} \quad \text{[Equation 11]}$$

As such, after calculation of the potential difference Vp21 between the tracking error signal at the header 1,2 field and the reference level, and the potential difference Vp22 between the tracking error signal at the header 3,4 field and the reference level, the difference between the two potential differences Vp21 and Vp22 is compared with the threshold, as a result of which the magnitude and the direction of tilt are detected.

When the difference between the two potential differences (Vp21−Vp22) is ΔV4, the absolute value of ΔV4 indicates the magnitude of tilt, the sign of ΔV4 indicating the direction of tilt. That is, it can be detected whether the disc is bending up or down with respect to a normal state.

If the sign of ΔV4 is negative (−), tilt is to be compensated by ΔV4 in the positive (+) direction; otherwise, if the sign of ΔV4 is positive (+), tilt is to be compensated by ΔV4 in the negative (−) direction. That is, compensation for tilt has to be performed in such a direction as to equalize the two potential differences Vp21 and Vp22.

Because the values of the tracking error signals detected at the header 1,2 field and the header 3,4 field are variable depending on the disc, the ratio of the two signals is normalized as expressed by Equation 12.

$$\left| \frac{Vp21-Vp22}{Vp21+Vp22} \right| < V_{Th4} \quad \text{[Equation 12]}$$

That is, if the Equation 12 is satisfied, it is determined that no tilt has occurred, otherwise, it means that tilt has occurred, after which the magnitude and the direction of tilt are detected from the absolute value and the sign of (Vp21−Vp22), respectively.

In connection with this, the tilt detector 205 calculates ΔV4 in the above-described manner and outputs to the servo controller 207 tilt error signals indicating the magnitude and the direction of tilt, which correspond to the absolute value and the sign of ΔV4, respectively. The servo controller 207 converts the tilt error signals to a tracking driving signal and outputs the tracking driving signal to the tilt driver 209.

The tilt driver 209 moves the disc or the optical pickup for direct control of tilt based on the tilt driving signal, i.e., by the magnitude of tilt in the positive (+) or negative (−) direction. That is, tilt control is performed in such a manner that the potential difference $Vp21=|V_{HD12}-V_{TE}|$ is in symmetric relation with the potential difference $Vp22=|V_{HD34}-V_{TE}|$, or that $|Vp21-Vp22| \leq V_{Th4}$ is satisfied.

Figure 16:
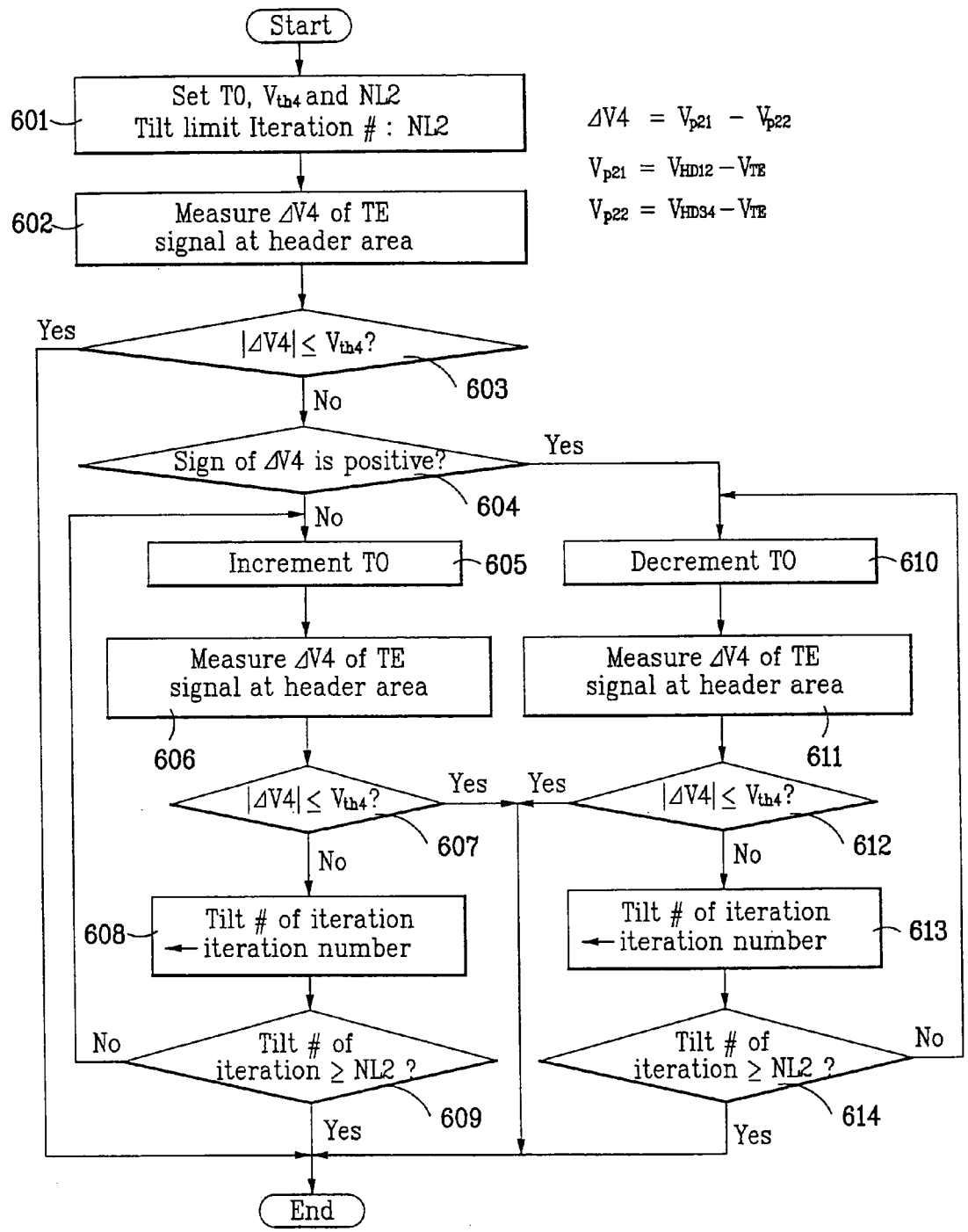
FIG. 16 is a flowchart of a tilt detecting and compensating procedure using tracking error signals of the header field in accordance with the present invention.

FIG. 16 is a flowchart of the above procedure.

Referring to FIG. 16, the step 601 sets an initial tilt offset T0, a threshold $V_{Th4}$ and a tilt limit iteration number NL2.

The step 602 measures Vp21 and Vp22 at tilt offset T0, then calculating the difference between Vp21 and Vp22, i.e., ΔV4 (=Vp21−Vp22). The step 603 determines whether the absolute value of ΔV4 exceeds the threshold $V_{Th4}$ preset in the step 601. If the absolute value of ΔV4 is smaller than or equal to the threshold $V_{Th4}$ in the step 603, which means that no tilt has occurred, the routine is terminated; otherwise, if the absolute value of ΔV4 is larger than the threshold $V_{Th4}$, which means that tilt has occurred, the step 604 determines the direction of tilt from a judgment of whether the sign of ΔV4 is positive (+) or negative (−). With the negative (−) sign of ΔV4, the step 605 increments the tilt offset T0 and the step 606 measures again the variation ΔV4 of the tracking error signals detected at the header 1,2 field and the header 3,4 field. Then, the step 607 compares the absolute value of the variation ΔV4 with the threshold $V_{Th4}$. If the absolute value of ΔV4 is smaller than or equal to the threshold $V_{Th4}$, the routine is terminated; otherwise, if the absolute value of ΔV4 is larger than the threshold $V_{Th4}$, which means that tilt is not completely compensated, the procedure proceeds to the step 608. The step 608 applies the current loop iteration number to the tilt iteration number and the step 609 compares the tilt iteration number with the preset tilt limit iteration number NL2. If the tilt iteration number is larger than or equal to the preset tilt limit iteration number NL2, the routine terminates; otherwise, the procedure returns to the step 605.

Meanwhile, if the sign of ΔV4 is positive (+) in step 604, the step 610 decrements the tilt offset T0 and the above process is repeated in steps 611 to 614.

Such as in the present invention, during tilt or servo control, the quantity of tilt between the optical axis and the disc plane can be detected and controlled by any one of the above-stated methods.

The present invention presets the thresholds and reduces time required for detecting and compensating tilt during the actual data write operation, thereby enabling a real time write operation through rapid stabilization of tracking servo.

Defocus Detection and Compensation

Using read channel 2 signal

The present invention detects defocus from variations of VFO1 and VFO3 signals in the header field. Here, the error area is used because of similarity of land and groove characteristics, and the reason for using signals of VFO1 and VFO3 areas in the header field lies in that the VFO1 and VFO3 areas are the longest and most stable areas in the header field and easy to detect.

To detect the magnitude and the direction of defocus from variations of read channel 2 signals detected at VFO1 and VFO3 areas in the header field, read channel 2 signals among the error signals detected at the RF and servo error generator 203 are input to the defocus detector 206. The defocus detector 206 detects the levels of the read channel 2 signals, i.e., peak-to-peak voltages Vpp31 and Vpp32 to determine presence of defocus.

Table 5 shows read channel 2 signals detected at VFO1 and VFO3 areas with track on after controlling defocus and detrack at tilt=0 (i.e., mechanism=0) for obtaining highest and planarized tracking error signals, in which the read channel 2 signal levels at VFO1 and VFO3 areas are changed due to variation of a defocus offset with fixed tilt and detrack offsets.

TABLE 5

| Defocus Offset [ ] | VFO1 [V] | VFO3 [V] |
|---|---|---|
| 0.00 | | |
| 1.00 | | |
| 2.00 | 0.142 | 0.087 |
| 3.00 | 0.178 | 0.151 |
| 4.08 | 0.192 | 0.199 |
| 5.00 | 0.162 | 0.201 |
| 6.00 | 0.119 | 0.181 |
| 7.00 | 0.064 | 0.139 |
| 8.00 | 0.021 | 0.089 |
| 9.00 | | |
| 10.00 | | |

Figure 17:
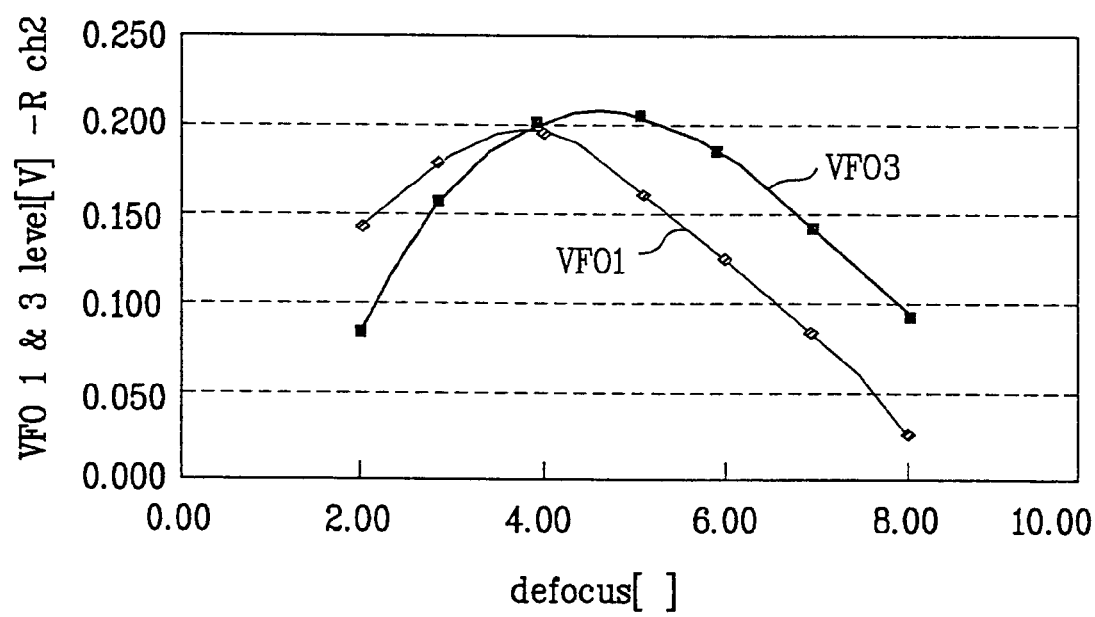
FIG. 17 is an exemplary graph showing read channel 2 signals detected at VFO1 and VFO3 areas in the header field depending on variation of a defocus offset.

FIG. 17 is a graph illustrating Table 5, in which no defocus is detected at highest voltage levels Vpp31 and Vpp32 of read channel 2 signals at VFO1 and VFO3 areas and the direction of defocus is detected from the sign of Vpp31−Vpp32.

That is, detection of defocus is based on the principle that variations of read channel 2 signals at VFO1 and VFO3 areas in the header field, e.g., peak-to-peak levels Vpp31 and Vpp32 depend on the degree of defocus.

If no defocus has occurred, i.e., "on-focus", then Vpp31−Vpp32≈0 and Vpp31+Vpp32=maximum, where Vpp31 and Vpp32 are peak-to-peak voltages of read channel 2 signals detected at VFO1 and VFO3 areas. No defocus is also detected when Vpp31−Vpp32≦$V_{Th5}$, where $V_{Th5}$ is a predetermined threshold value, instead of Vpp31−Vpp32≈0.

Otherwise, if defocus has occurred, then Vpp31−Vpp32≠0 (the sign of the difference value depends on the direction of defocus) and Vpp31+Vpp32≠maximum. Defocus is also detected when Vpp31−Vpp32>$V_{Th5}$, where $V_{Th5}$ is a predetermined threshold value. The direction of defocus is known from the sign of Vpp31−Vpp32.

Referring to Table 5 or FIG. 17, at defocus offset 4.08, Vpp31−Vpp32≈0, Vpp31+Vpp32=maximum and the curve has an inflection. That is, the value Vpp31−Vpp32 is varying in one direction (e.g., successively increasing or decreasing) on the basis of defocus offset 4.08, which facilitates signal detection.

Figure 18A:
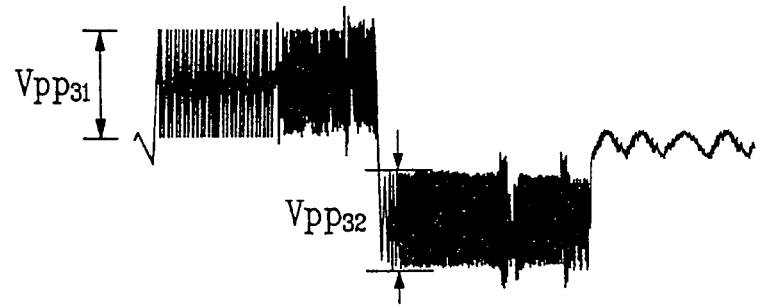
FIGS. 18a-18c are exemplary diagrams showing the level variation of channel 2 signals detected at VFO1 and VFO3 areas in the header field depending on variation of a defocus offset.
Figure 18B:
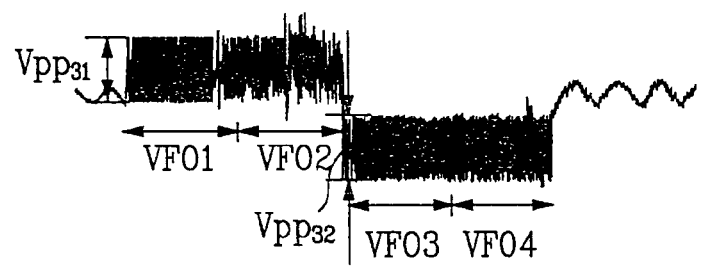
Figure 18C:
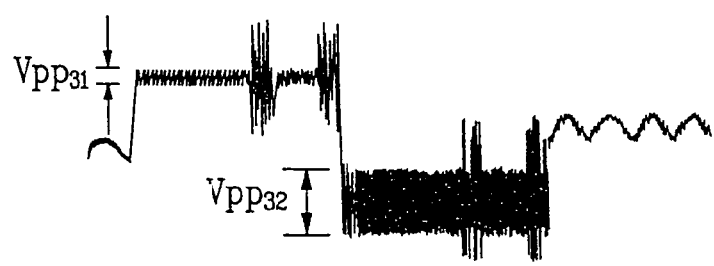

FIGS. 18a-18c are exemplary diagrams showing the level variation of the read channel 2 signals detected at a variable defocus offset under the same conditions as Table 5.

Referring to FIGS. 18a-18c, the value Vpp31+Vpp32 is at maximum in FIG. 18b, which means that no defocus has occurred. And, defocus is detected in FIGS. 18a and 18c.

If the value Vpp31−Vpp32 is ΔV5 and the absolute value of ΔV5 is larger than the threshold $V_{Th5}$ or the value Vpp31+Vpp32 is not at maximum, then compensation for defocus has to be performed in the positive (+)/negative (−) direction when the sign of ΔV5 is negative (−)/positive (+).

As the values Vpp31 and Vpp32 are variable depending on the disc, the ratio of the two signals is normalized as expressed by Equation 13.

$$\left| \frac{Vpp31 - Vpp32}{Vpp31 + Vpp32} \right| < V_{Th5} \qquad \text{[Equation 13]}$$

If Equation 13 is satisfied, no defocus has occurred. Otherwise, if Equation 13 is not satisfied, it is determined that focus has occurred, and the magnitude and the direction of defocus are detected from the absolute value and the sign of the difference (=Vpp31−Vpp32), respectively.

In connection with this, the defocus detector 206 outputs to the servo controller 207 defocus error signals indicating the magnitude and the direction of defocus detected in the above process. The servo controller 207 converts the defocus error signals to a focus driving signal and outputs the focus driving signal to the focus driver 210.

The tracking driver 210 drives a focus actuator in the optical pickup 202 based on the focus driving signal, i.e., moves the optical pickup 202 by the magnitude of defocus in the positive (+) or negative (−) direction such that the object lens is separated from the optical disc at a constant distance.

Figure 19:
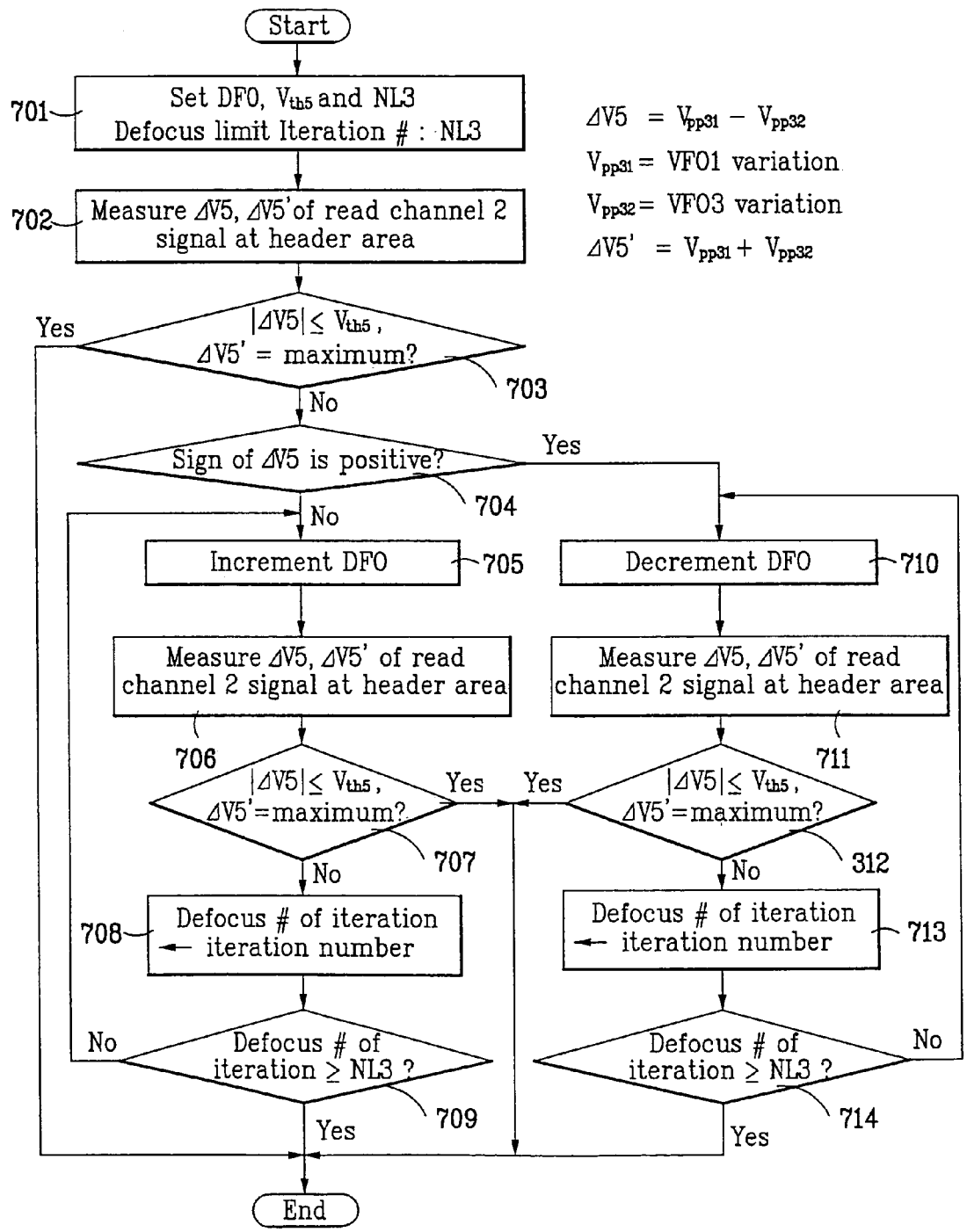
FIG. 19 is a flowchart of a defocus detecting and compensating procedure using read channel 2 signals of the header field in accordance with the present invention.

FIG. 19 is a flowchart of the above procedure.

Referring to FIG. 19, the step 701 sets an initial defocus offset DF0, a threshold $V_{Th5}$ and a defocus limit iteration number NL3. The step 702 measures Vpp31 and Vpp32 at defocus offset DF0, then calculating the difference ΔV5 (=Vpp31−Vpp32) and the sum ΔV5' (=Vpp31+Vpp32). The step 703 determines whether the absolute value of ΔV5 is smaller than or equal to the threshold $V_{Th5}$ preset in the step 701 and the sum ΔV5' is at maximum. If the absolute value of ΔV5 is smaller than or equal to the threshold $V_{Th5}$ and the sum ΔV5' is at maximum in the step 703, which means that no defocus has occurred, the routine is terminated. Otherwise, if the absolute value of ΔV5 is larger than the threshold $V_{Th5}$ or the sum ΔV5' is not at maximum, which means that defocus has occurred, the step 704 detects the sign of ΔV5.

With negative (−) sign of ΔV5, the step 705 increments the defocus offset DF0 and the step 706 measures again the difference ΔV5 and the sum ΔV5' for the read channel 2 signals detected at VFO1 and VFO3 areas in the header field. Then, the step 707 compares the absolute value of ΔV5 with the threshold $V_{Th5}$ and determines whether the sum ΔV5' is at maximum. If the absolute value of ΔV5 is smaller than or equal to the threshold $V_{Th5}$ and the sum ΔV5' is at maximum, the routine is terminated. Otherwise, if the absolute value of ΔV5 is larger than the threshold $V_{Th5}$ or the sum ΔV5' is not at maximum, which means that defocus is not completely compensated, the procedure proceeds to the step 708. The step 708 applies the current loop iteration number to the defocus iteration number and the step 709 compares the defocus iteration number with the preset defocus limit iteration number NL3.

If the defocus iteration number is larger than or equal to the preset defocus limit iteration number, the routine terminates; otherwise, the procedure returns to the step 705.

Meanwhile, if the step 704 determines that the sign of ΔV5 is positive (+), the defocus offset DF0 is decremented in step 710 and the above process is repeated in steps 711 to 714. Likewise, the determination and comparison process for the defocus limit iteration number NL3 is the same in reason as the previously described process for the detrack limit iteration number NL1.

2) Using read channel 1 signal and read channel 2 signal

The present invention also detects defocus using both read channel 1 signals and read channel 2 signals.

That is, defocus is detected from variation of read channel 1 signals at VFO1 and VFO3 areas in the header field and the magnitude and the direction of defocus are detected from variation of read channel 2 signals.

For this purpose, among the error signals detected at the RF and servo error generator 203, both read channel 1 signals and read channel 2 signals are input to the defocus detector 206. The defocus detector 206 detects the levels of the read channel 1 signals, i.e., peak-to-peak voltages to determine presence of defocus.

Table 6 shows read channel 1 signals detected at VFO1 and VFO3 areas with track on after controlling defocus and detrack at tilt=0 (i.e., mechanism=0) for obtaining highest and planarized tracking error signals, in which the read channel 1 signal levels at VFO1 and VFO3 areas are changed due to variation of a defocus offset with fixed tilt and detrack offsets.

TABLE 5

| Defocus Offset [ ] | VFO1 [V] | VFO3 [V] |
|---|---|---|
| 0.00 | | |
| 0.00 | | |
| 1.00 | | |
| 2.00 | 0.126 | 0.137 |
| 3.00 | 0.162 | 0.185 |
| 4.08 | 0.192 | 0.187 |
| 5.00 | 0.206 | 0.183 |
| 6.00 | 0.176 | 0.153 |
| 7.00 | 0.121 | 0.114 |
| 8.00 | 0.069 | 0.073 |
| 9.00 | | |
| 10.00 | | |

Figure 20:
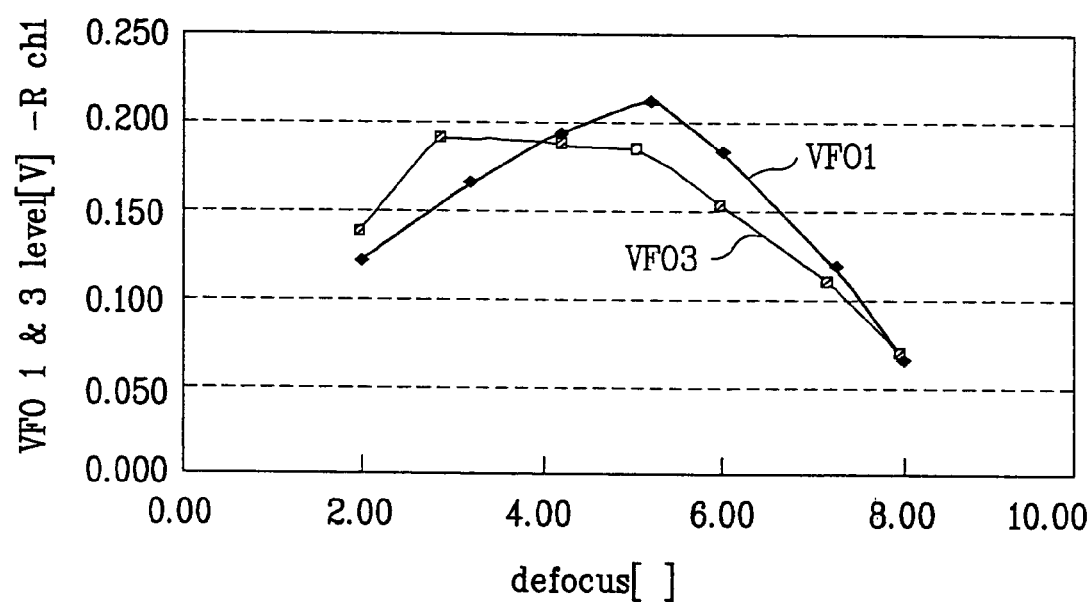
FIG. 20 is an exemplary graph showing read channel 2 signals detected at VFO1 and VFO3 areas in the header field depending on variation of a defocus offset.

FIG. 20 is a graph illustrating Table 6, in which no defocus is detected at highest voltage levels Vpp31' and Vpp32' of read channel 1 signals at VFO1 and VFO3 areas, and the magnitude and the direction of defocus are detected from the absolute value and the sign of Vpp31'−Vpp32', respectively.

That is, detection of defocus is based on the principle that variations of read channel 1 signals at VFO1 and VFO3 areas in the header field, e.g., peak-to-peak levels Vpp31' and Vpp32' depend on the degree of defocus.

If no defocus has occurred, i.e., "on-focus", then Vpp31'−Vpp32'≈0 and Vpp31'+Vpp32'=maximum, where Vpp31' and Vpp32' are peak-to-peak voltages of read channel 1 signals detected at VFO1 and VFO3 areas.

No defocus is also detected when Vpp31'+Vpp32'=maximum and Vpp31'−Vpp32'≦$V_{Th55}$, where $V_{Th55}$ is a predetermined threshold value, instead of Vpp31'−Vpp32'≈0.

Otherwise, if defocus has occurred, then Vpp31'−Vpp32'≠0 (the sign of the difference value depends on the direction of defocus) and Vpp31'+Vpp32'≠maximum. Defocus is also detected when Vpp31'−Vpp32'>$V_{Th55}$, the direction of defocus being known from the sign of Vpp31'−Vpp32'.

Referring to Table 6 or FIG. 20, at defocus offset 4.08, Vpp31'−Vpp32'≈0, Vpp31'+Vpp32'=maximum.

For read channel 1 signals, it is necessary to define an active area in order to acquire accurate detection of defocus because there are many cases where Vpp31'−Vpp32'≦$V_{Th55}$, as shown in FIG. 20.

Figure 22A:
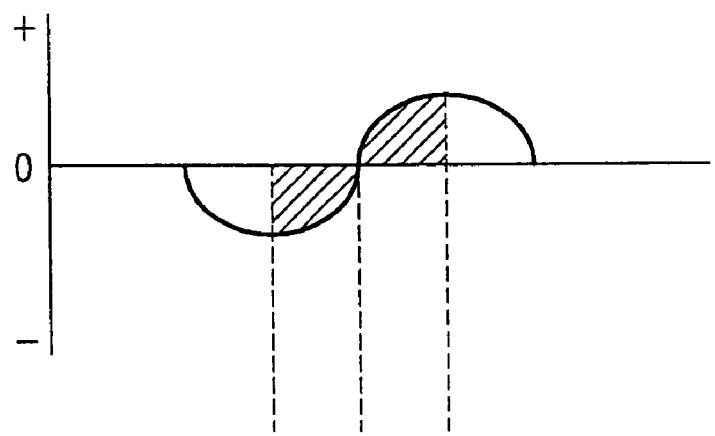
FIGS. 22a and 22b are exemplary diagrams showing the level variations of read channel 1 signals and read channel 2 signals detected at VFO1 and VFO3 areas in the header field depending on variation of a defocus offset.
Figure 22B:
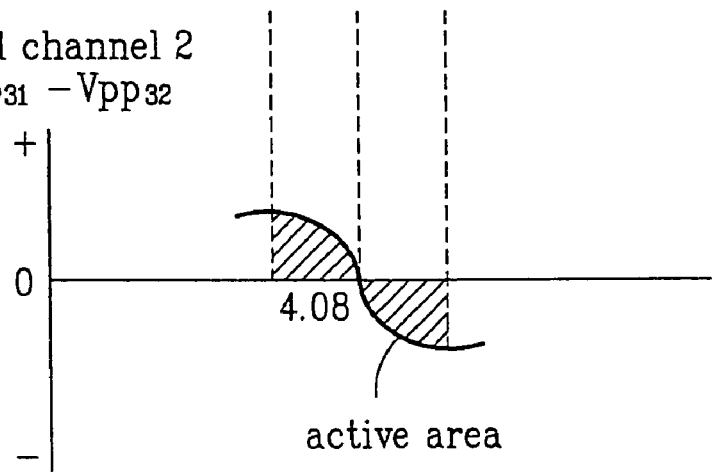

FIG. 22a shows the value of Vpp31'−Vpp32' for read channel 1 signals and FIG. 22b shows the value of Vpp31−Vpp32 for read channel 2 signals.

Referring to FIGS. 22a and 22b, when no defocus has occurred, i.e., near the defocus offset of 4.08, Vpp31'−Vpp32' for read channel 1 signals and Vpp31−Vpp32 for read channel 2 signals are both changed greatly. After the defocus offset of 4.08, Vpp31'−Vpp32' for read channel 1 signals decreases but Vpp31−Vpp32 for read channel 2 signals is constant.

Thus the active area can be defined as an interval where both Vpp31'−Vpp32' for read channel 1 signals and Vpp31−Vpp32 for read channel 2 signals change proportionally.

Figure 21A:
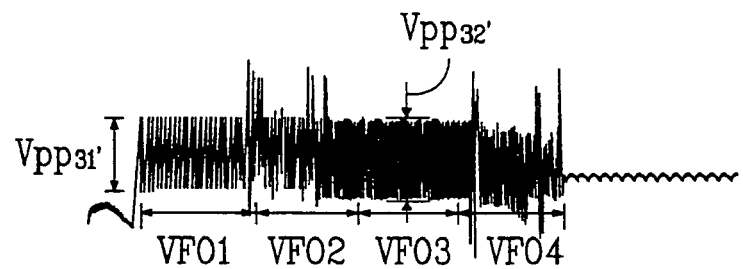
FIGS. 21a-21c are exemplary diagrams showing the level variation of read channel 2 signals detected at VFO1 and VFO3 areas in the header field depending on variation of a defocus offset.
Figure 21B:
Figure 21C:
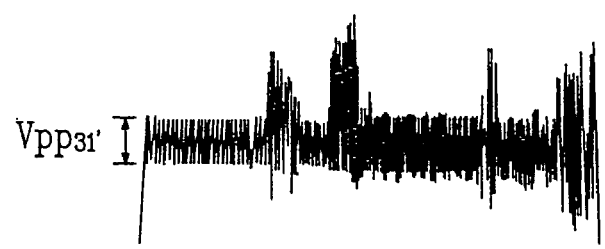

FIGS. 21a-21c are exemplary diagrams showing the level variation of the read channel 1 signals detected at a variable defocus offset under the same conditions as Table 6.

Referring to FIGS. 21a-21c, the difference value Vpp31'−Vpp32' approaches zero in all cases and the sum Vpp31'+Vpp32' is at maximum in FIG. 21b. Thus defocus is detected in FIGS. 21a and 21c, no defocus being detected in FIG. 21b. That means, it is determined that defocus has occurred in FIGS. 21a and 21c, where the difference value Vpp31'−Vpp32' approaches zero in both cases and the non-active area is defined.

If the value Vpp31'−Vpp32' is ΔV5" and the absolute value of ΔV5" is larger than the threshold $V_{Th55}$, then compensation for defocus has to be performed in the positive (+)/negative (−) direction when the sign of ΔV5" is negative (−)/positive (+). The magnitude of defocus can be measured as the size of the active area.

As the values Vpp31' and Vpp32' are variable depending on the disc, the ratio of the two signals is normalized as expressed by Equation 14.

$$\left| \frac{Vpp31' - Vpp32'}{Vpp31' + Vpp32'} \right| < V_{Th55} \quad \text{[Equation 14]}$$

If Equation 14 is satisfied, no defocus has occurred; otherwise, if Equation 14 is not satisfied, it is determined that focus has occurred. The direction of defocus is detected from the sign of Vpp31'−Vpp32', the magnitude of defocus being detected from the size of the active area detected using both the read channel 1 and the read channel 2.

In connection with this, the defocus detector 206 outputs to the servo controller 207 defocus error signals indicating the direction of defocus detected in the above process. The servo controller 207 converts the defocus error signals to a focus driving signal and outputs the focus driving signal to the focus driver 210.

The tracking driver 210 drives a focus actuator in the optical pickup 202 based on the focus driving signal, i.e., moves the optical pickup 202 in the positive (+) or negative (−) direction such that the object lens is separated from the optical disc at a constant distance.

As such, the present invention can detect the magnitude and the direction of defocus and compensate for them using read channel 1 signals or read channel 2 signals detected at VFO1 and VFO3 areas in the header field.

The system, the present invention checks defocus at a plurality of header fields predefined during initialization of the system in the above-stated way and memories the magnitude and the direction of defocus at the corresponding position. Thus the present invention can compensate for defocus according to the previously detected magnitude and direction of defocus at the corresponding position during an actual data writing/reading operation and thereby rapidly stabilize focus servo.

Furthermore, the present invention capable of real-time feedback can detect defocus with all servo offsets, e.g., tracking and focus servo on and immediately compensate for defocus during an actual data writing/reading operation.

3) Using tracking error signal

The present invention also detects defocus using a level difference between tracking error signals detected at the header 1,2 field and the header 3,4 field staggered with respect to each other and a reference signal. The reference signal level is the center level of the tracking error signal detected at a user area.

For this, the tracking error (TE) signals among the servo error signals detected at the RF and servo error generator 203 are input to the defocus detector 206.

After sampling the tracking error signals output from the header 1,2 field and the header 3,4 field, the defocus detector 206 detects the level difference between the tracking error signals and the reference signal Table 7 shows the tracking error signal levels under best conditions for generating servo error signals while controlling defocus and defocus in a state of tilt zero (i.e., mechanism 0), in which the tracking error signal levels change depending on variation of a defocus offset at fixed tilt and detrack offsets.

TABLE 7

| Defocus Offset [ ] | Header 1,2 [V] | Header 3,4 [V] |
|---|---|---|
| 0.00 | | |
| 1.00 | | |
| 2.00 | 2.2 | 1.70 |
| 3.00 | 3.3 | 2.70 |
| 4.08 | 3.5 | 3.30 |
| 5.00 | 3.1 | 3.70 |
| 6.00 | 2.7 | 3.70 |
| 7.00 | 2.2 | 3.10 |
| 8.00 | 1.8 | 2.70 |
| 9.00 | | |
| 10.00 | | |

Figure 23:
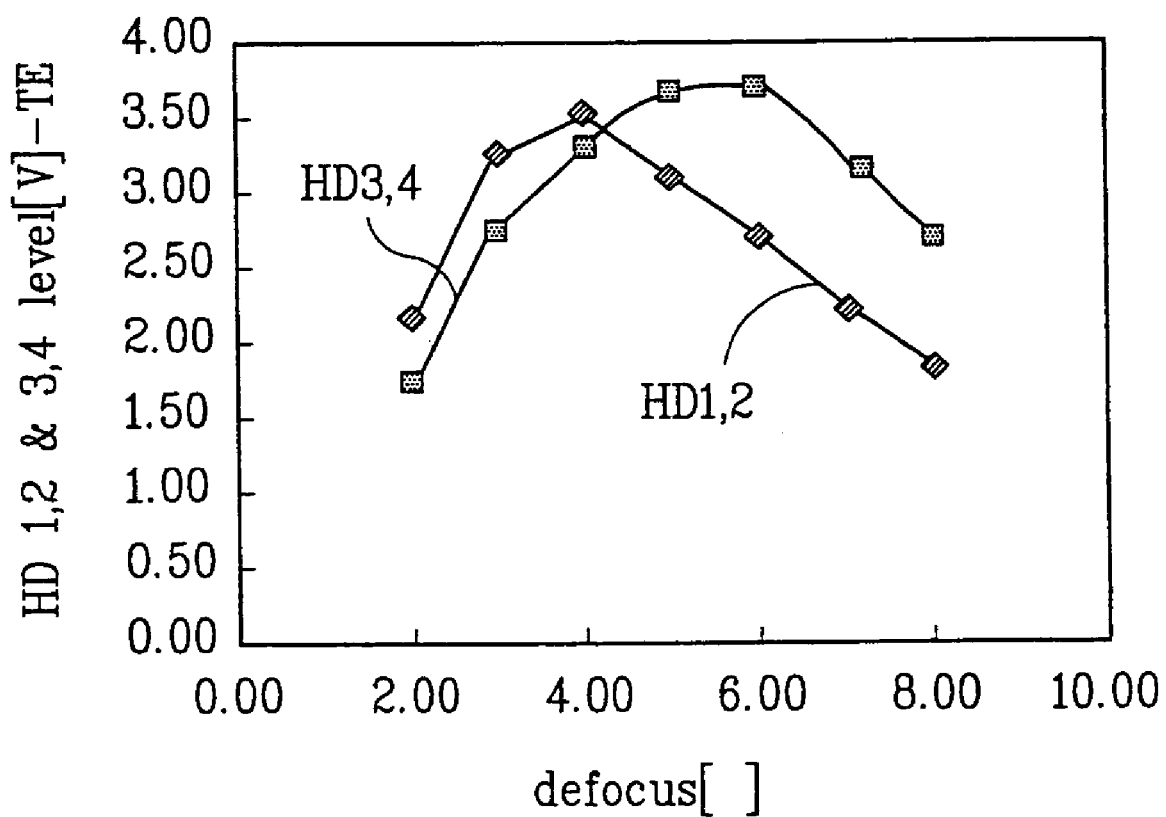
FIG. 23 is an exemplary graph showing tracking error signals detected at a header 1,2 field and a header 3,4 field depending on variation of a defocus offset.

FIG. 23 is a graph illustrating Table 7, in which no defocus occurs when the potential difference between the tracking error signal detected at the header 1,2 field and the reference signal is in symmetric relation with the potential difference between the tracking error signal detected at the header 3,4 field and the reference signal.

That is, the tracking error signals are significantly shifted up and down in the header field. For tracking error signals detected at the user area on which data is actually written, the two potential differences are almost equal to each other when no defocus occurs, i.e., the beam is at the track center, whereas they are not equal to each other when defocus occurs, i.e., the beam passes through the header 1,2 field and the header 3,4 field.

Thus whether or not defocus has occurred can be determined by comparing the potential difference between the tracking error signal at the header 1,2 field and the reference signal (tracking error signal potential at header 1,2 field−reference potential=Vp31) with the potential difference between the tracking error signal at the header 3,4 field and the reference signal (tracking error signal potential at header 3,4 field−reference potential=Vp32).

Figure 24A:
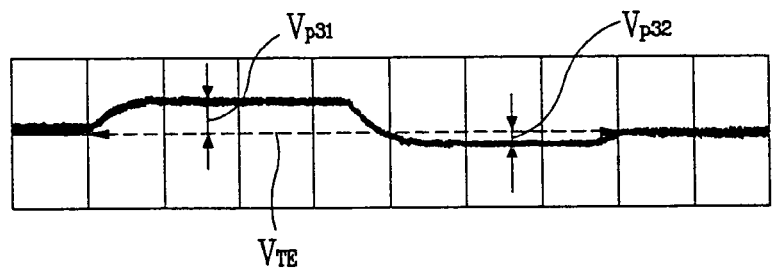
FIGS. 24a-24c are exemplary diagrams showing level variation of the tracking error signals detected at a header 1,2 field and a header 3,4 field depending on variation of a defocus offset.
Figure 24B:
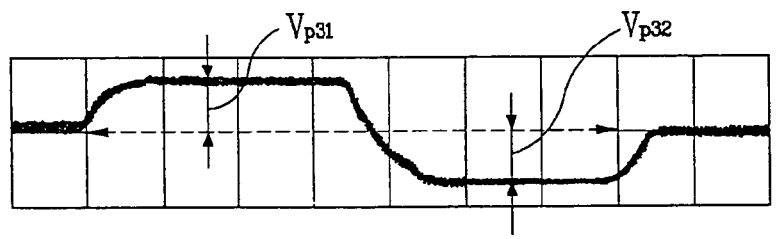
Figure 24C:
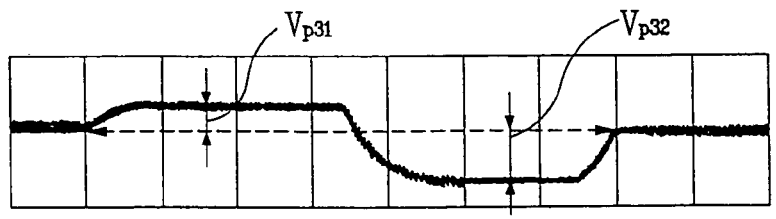

FIGS. 24a-24c are exemplary diagrams showing tracking error signals detected at a variable defocus offset with tracking and focus on.

Referring FIGS. 24a-24c, the left-hand signal is the tracking error signal $V_{HD12}$ detected at the header 1,2 field, the right-hand signal being the tracking error signal $V_{HD34}$. A voltage $V_{TE}$ detected at the center level of the tracking error signal at the user area is preferably the voltage of the reference level.

In a case where no defocus occurs, the potential difference between the tracking error signal at the header 1,2 field and the reference level (Vp31=|$V_{HD12}$−$V_{TE}$|) is almost equal to the potential difference between the tracking error signal at the header 3,4 field and the reference level (Vp32=|$V_{HD34}$−$V_{TE}$|), as shown in FIG. 24b. That is, the potential difference Vp31=|$V_{HD12}$−$V_{TE}$| is in symmetric relation with the potential difference Vp32=|$V_{HD34}$−$V_{TE}$|.

This can be expressed by Equation 15.

$$|V_{HD12} - V_{TE}| \approx |V_{HD34} - V_{TE}|$$ [Equation 15]

It is determined that no defocus has occurred, when the potential difference Vp31 between the tracking error signal at the header 1,2 field and the reference level is not equal to the potential difference Vp32 between the tracking error signal at the header 3,4 field and the reference level, as shown in FIGS. 24a and 24c, i.e., the potential difference Vp31 is in asymmetric relation with to the potential difference Vp32. The asymmetry increases with greater magnitude of defocus.

Thus it is determined that defocus has occurred, when the potential difference between the tracking error signal at the header 1,2 field and the reference level (Vp31=|$V_{HD12}$−$V_{TE}$|) is not equal to the potential difference between the tracking error signal at the header 3,4 field and the reference level (Vp32=|$V_{HD34}$−$V_{TE}$|), i.e., the absolute value of the difference between the two potentials (=Vp31−Vp32) exceeds a threshold $V_{Th6}$. Otherwise, as expressed by Equation 16, it is determined that no defocus has occurred.

$$|Vp31 - Vp32| \leq V_{Th6}$$ [Equation 16]

As such, after calculation of the potential difference Vp31 between the tracking error signal at the header 1,2 field and the reference level, and the potential difference Vp32 between the tracking error signal at the header 3,4 field and the reference level, the difference between the two potential differences Vp31 and Vp32 is compared with the threshold, as a result of which the magnitude and the direction of defocus are detected.

When the difference between the two potential differences (Vp31−Vp32) is ΔV6, the absolute value of ΔV6 indicates the magnitude of defocus, the sign of ΔV6 indicating the direction of defocus.

If the sign of ΔV6 is negative (−), defocus is to be compensated by ΔV6 in the positive (+) direction; otherwise, if the sign of ΔV6 is positive (+), defocus is to be compensated by ΔV6 in the negative (−) direction. That is, compensation for defocus has to be performed in such a direction as to equalize the two potential differences Vp31 and Vp32.

Because the values of the tracking error signals detected at the header 1,2 field and the header 3,4 field are variable depending on the disc, the ratio of the two signals is normalized.

In connection with this, the defocus detector 206 calculates ΔV6 in the above-described manner and outputs to the servo controller 207 defocus error signals indicating the magnitude and the direction of defocus, which correspond to the absolute value and the sign of ΔV6, respectively. The servo controller 207 converts the defocus error signals to a focus driving signal and outputs the focus driving signal to the focus driver 210.

The focus driver 208 moves a focus actuator in the optical pickup 202 based on the focus error signal so that the object lens is separated from the optical disc at a constant distance.

That is, defocus is controlled in such a manner that the potential difference between the tracking error signal at the header 1,2 field and the reference level (Vp31=|$V_{HD12}-V_{TE}$|) is in symmetric relation with the potential difference between the tracking error signal at the header 3,4 field and the reference level (Vp32=|$V_{HD34}-V_{TE}$|), or the relationship |Vp31−Vp32|≦$V_{Th6}$ is satisfied.

Figure 25:
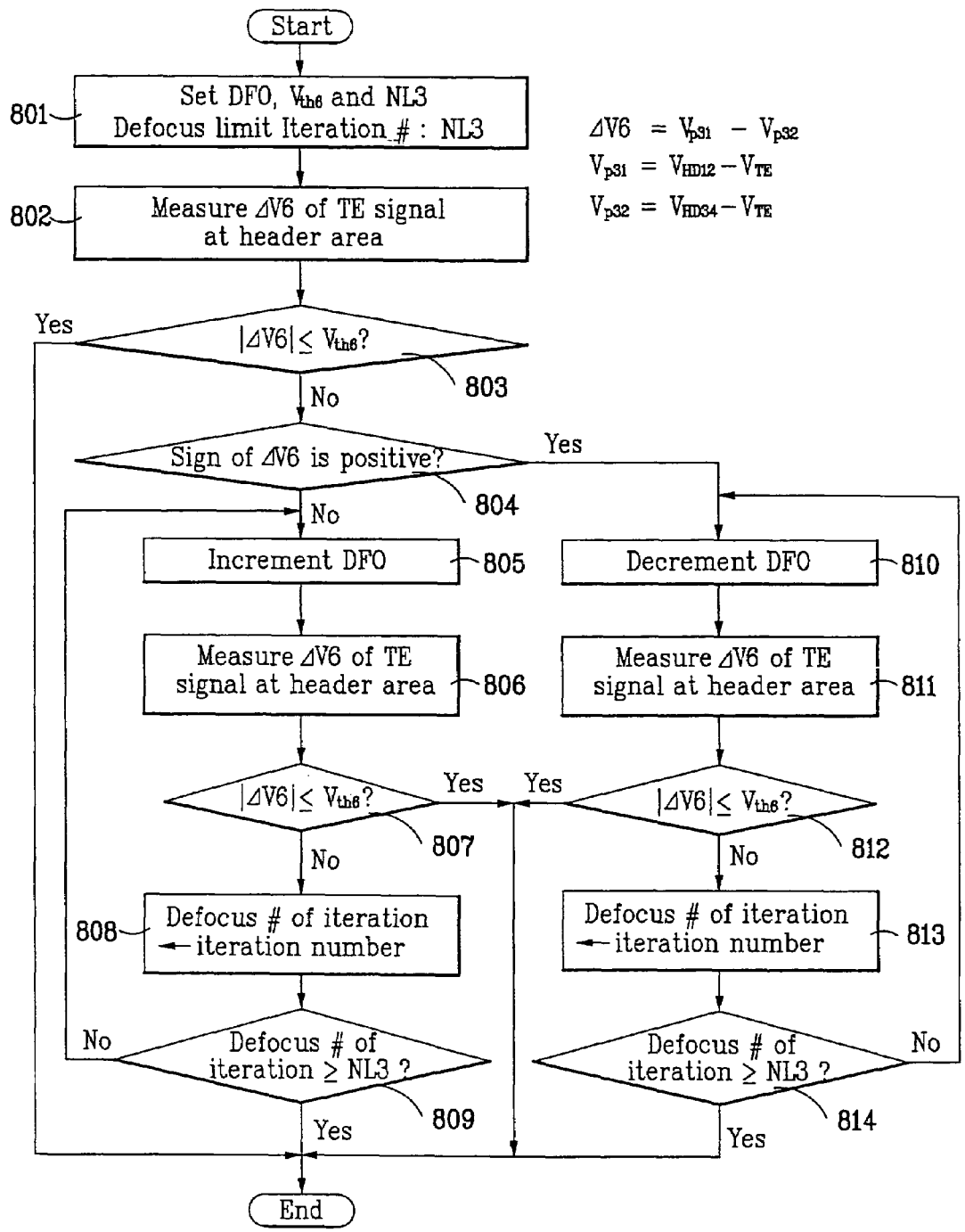
FIG. 25 is a flowchart of a defocus detecting and compensating procedure using tracking error signals of the header field in accordance with the present invention.

FIG. 25 is a flowchart of the above procedure.

Referring to FIG. 25, the step 801 sets an initial defocus offset DF0, a threshold $V_{Th6}$ and a defocus limit iteration number NL3.

The step 802 measures Vp31 and Vp32 at defocus offset DF0, then calculating the difference between Vp31 and Vp32, i.e., ΔV6 (=Vp31−Vp32). The step 803 determines whether the absolute value of ΔV6 exceeds the threshold $V_{Th6}$ preset in the step 801. If the absolute value of ΔV6 is smaller than or equal to the threshold $V_{Th6}$ in the step 803, which means no defocus, the routine is terminated; otherwise, if the absolute value of ΔV6 is larger than the threshold $V_{Th6}$, which means that defocus has occurred, the step 804 determines the direction of defocus from a judgment of whether the sign of ΔV6 is positive (+) or negative (−).

With the negative (−) sign of ΔV6, the step 805 increments the defocus offset DF0 and the step 806 measures again the variation ΔV6 of the tracking error signals detected at the header 1,2 field and the header 3,4 field. Then, the step 807 compares the absolute value of the variation ΔV6 with the threshold $V_{Th6}$. If the absolute value of ΔV6 is smaller than or equal to the threshold $V_{Th6}$, the routine is terminated; otherwise, if the absolute value of ΔV6 is larger than the threshold $V_{Th6}$, which means that defocus is not completely compensated, the procedure proceeds to the step 808. The step 808 applies the current loop iteration number to the defocus iteration number and the step 809 compares the defocus iteration number with the preset defocus limit iteration number NL3. If the defocus iteration number is larger than or equal to the preset defocus limit iteration number NL3, the routine terminates; otherwise, the procedure returns to the step 805.

Meanwhile, if the sign of ΔV6 is positive (+) in step 804, the step 810 decrements the defocus offset DF0 and the above process is repeated in steps 811 to 814.

The present invention presets the thresholds and reduces time required for detecting and compensating defocus during an actual data writing operation, thereby enabling a real time writing operation through rapid stabilization of focus servo.

According to the present invention, the detrack limit iteration number NL1, the tilt limit iteration number NL2 and the defocus limit iteration number NL3 are determined in an apriori manner and may be altered by the designer.

In a case where the direction is not detected during detection of detrack, tilt and defocus by the above methods, detrack, tilt and defocus can be compensated by the variations obtained in the respective detecting processes. For this, the respective offsets have to be controlled such that the variations become smaller. For example, if the variations at the current offsets are smaller than those at the previous offsets, it is necessary to check whether the variations are within the range of predetermined thresholds, while controlling the offsets in the same direction (i.e., positive (+) or negative (−) direction). Otherwise, if the variations at the current offsets are increased from those at the previous offsets, it is necessary to check whether the variation are within the range of predetermined thresholds, while controlling the offsets in the reverse direction. This procedure is repeated until the variations are within the predetermined thresholds, and then the control is terminates.

Although it is assumed in the above description of the present invention that the procedure for detecting and compensating each of detrack, tilt and defocus is performed under the condition the others do not occur, actually, all of detract, tilt and defocus or any one of them may occur. It is thus preferable to sequentially perform all the compensation processes for detrack, tilt and defocus. There is no particular limitation on the order of the processes and may be varied depending on the designer. In an embodiment of the present invention, as illustrated in FIG. 26, the controls are performed in the order of detrack, tilt and defocus.

Figure 26:
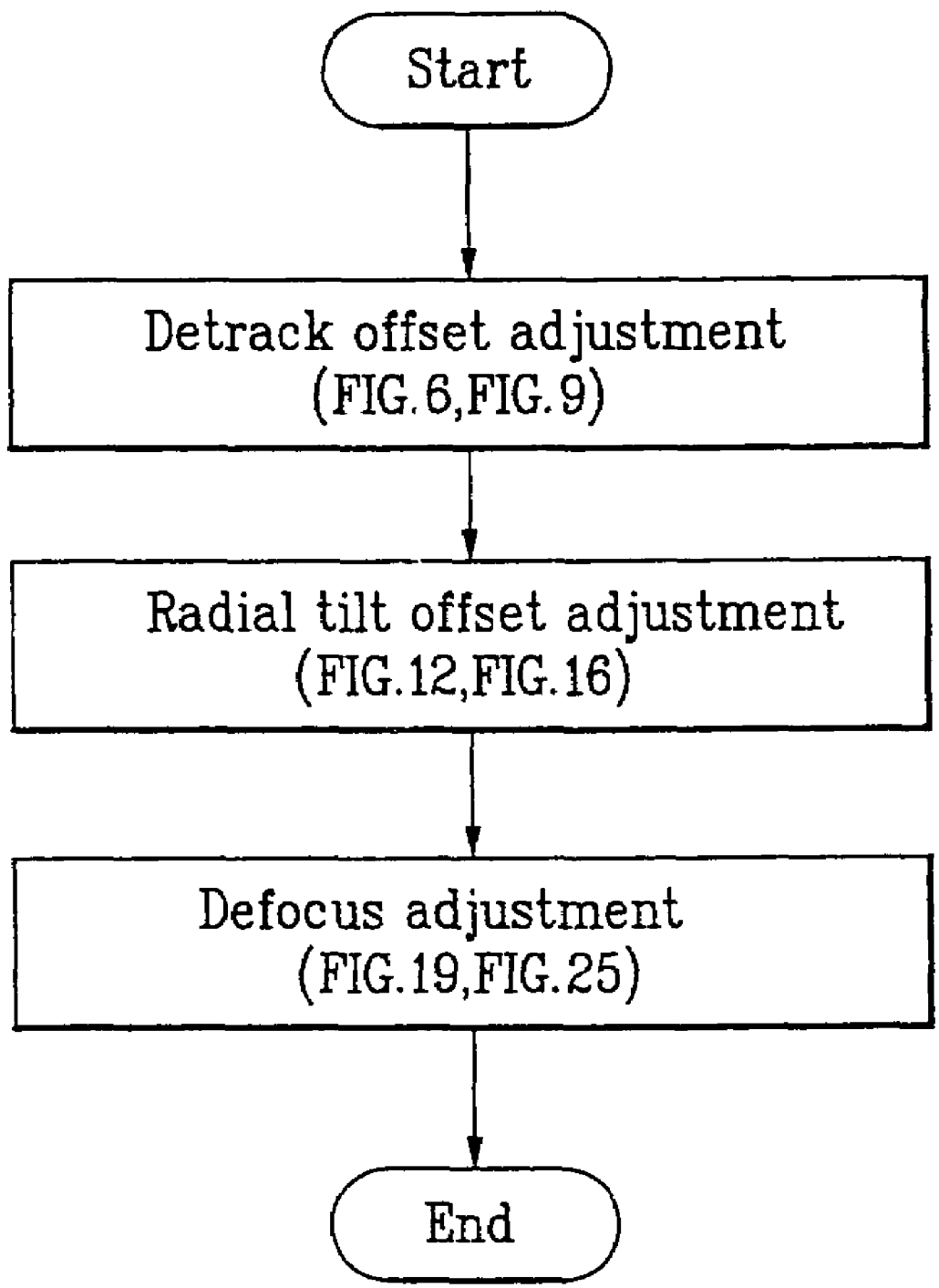
FIG. 26 is a flowchart showing a procedure for sequentially detecting and compensating for detrack, tilt and defocus of an optical recording medium in accordance with the present invention.

The above controls as illustrated in FIG. 26 may be performed once in initializing the system, or periodically during a recording/reproducing operation, or at any time that the controller such as microcomputer affords to its. Also, the controls may be performed during the initialization of the system or while the system is running.

In performing the controls during the initialization of the system, the magnitude and the direction of detrack, tilt and defocus are detected at one or more predefined positions in inner or outer circumferences, followed by a recording or reproducing operation, or the magnitude and the direction of detrack, tilt and defocus detected at the predetermined positions are stored and then immediately used for the controls during the actual running operation.

The method for reproducing records for the optical recording medium according to the present invention has the following advantages in that: (1) the magnitude and the direction of detrack, tilt and defocus can be detected from read channel 2 signals detected at the header fields staggered on the basis of the tract center, or tracking error signals, and compensates for detrack, tilt and defocus, thereby preventing deterioration of data quality caused by detrack, tilt and defocus during a recording/reproducing operation and enabling the stable operation of the system; (2) tilt can be detected in a stable and accurate manner without using a separate light-receiving element in a high-density optical disc; and (3) the focus servo is rapidly stabilized to enable real-time recording as well as the stable operation of the system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling a servo operation of an optical recording medium including a non-writable area having a plurality of header fields with at least one header field staggered with respect to another header field, the method comprising:

(a) determining a difference between a first synchronization reference signal included in the one header field and a second synchronization reference signal included in said another header field, wherein the determined difference between the first and second synchronization reference signals represents a radial tilt of the optical recording medium; and (b) controlling the servo operation of the optical recording medium based on the determined difference in the step (a).

2. The method of claim 1, wherein the first and second reference signals respectively correspond to read channel 2 signals obtained from the one header field and said another header field, said read channel 2 signals corresponding to a difference between reflected signals obtained by a split photo detector.

3. The method of claim 1, wherein the first and second reference signals comprise VFO (Variable Frequency Oscillator) signals.

4. The method of claim 3, wherein the plurality of header fields include at least first, second, third and fourth header fields, and said one header field corresponds to the first header field and said another header field corresponds to the third header field in which the first header field is staggered with respect to the third header field.

5. The method of claim 4, wherein the determined difference between the first and second reference signals corresponds to a level difference between the VFO signal of the first header field and the VFO signal of the third header field.

6. The method of claim 4, wherein the step (a) determines the difference between the first and second reference signals by comparing a potential difference between a track center and the VFO signal of the first header field with a potential difference between the track center and the VFO signal of the third header field.

7. The method of claim 4, wherein the step (a) determines the difference between the first and second reference signals by comparing a potential difference between a ground level and the VFO signal of the first header field with a potential difference between the ground level and the VFO signal of the third header field.

8. The method of claim 3, wherein the first and second reference signals are a peak-to-peak value of the corresponding VFO signal.

9. The method of claim 3, wherein the first and second reference signals are at least one from a bottom holding signal and a peak holding signal of the corresponding VFO signal.

10. The method of claim 3, wherein the first and second reference signals are a hold signal of a center of the corresponding VFO signal.

11. The method of claim 10, further comprising:
(c) controlling the servo operation of the optical recording medium to compensate the radial tilt, if the compared difference is larger than the threshold value.

12. The method claim 1, wherein the controlling step (b) controls the servo operation of the optical recording medium to compensate the radial tilt based on the determined difference between the first and second reference signals.

13. The method of claim 1, wherein the determining step (a) further includes detecting a magnitude and/or a direction of the radial tilt.

14. The method of claim 13, wherein the controlling step (b) controls the servo operation of the optical recording medium to compensate the radial tilt based on the detected magnitude and/or direction of the radial tilt.

15. The method of claim 1, wherein the step (b) further comprises:
comparing the determined difference of the first and second reference signals with a threshold value.

16. The method of claim 1, wherein the plurality of header fields include at least first, second, third and fourth header fields in which the first and second header fields are staggered with respect to the third and fourth header fields.

17. The method of claim 16, wherein the step (a) determines a difference between a first signal detected from the first and second header fields and a second signal detected from the third and fourth header fields, and the step (b) controls the servo operation of the optical recording medium based on the determined difference between the first and second detected signals.

18. The method of claim 17, wherein the first reference signal corresponds to a signal read from the first header field, the second reference signal corresponds to a signal read from the second header field, a third reference signal corresponds to a signal read from the third header field, and a fourth reference signal corresponds to a signal read from the fourth header field, and
wherein the first signal detected from the first and second header fields is based on the first and second reference signals, and the second signal detected from the third and fourth header fields is based on the third and fourth reference signals.

19. The method of claim 18, wherein the first, second, third and fourth reference signals comprise VFO (Variable Frequency Oscillator) signals.

20. The method of claim 19, wherein the first, second, third and fourth VFO signals correspond to read channel 2 signals obtained from the first, second, third and fourth header fields, respectively, said read channel 2 signals corresponding to a difference between reflected signals obtained by a split photo detector.

21. The method of claim 17, wherein the determined difference between the detected first and second signals represents a radial tilt of the optical recording medium.

22. The method claim 21, wherein the controlling step (b) controls the servo operation of the optical recording medium to compensate the radial tilt based on the determined difference between the detected first and second signals.

23. The method of claim 21, wherein the determining step (a) further includes detecting a magnitude and/or a direction of the radial tilt.

24. The method of claim 23, wherein the controlling step (b) controls the servo operation of the optical recording medium to compensate the radial tilt based on the detected magnitude and/or direction of the radial tilt.

25. A method for controlling a servo operation of an optical recording medium including a non-writable area having first, second, third and fourth header fields in which the first and second header fields are staggered with the third and fourth header fields, the method comprising:
(a) determining a difference between a VFO (Variable Frequency Oscillator) signal of the first header field and a VFO signal of the third header field, wherein the determined difference between the VFO signal of the first header field and the VFO signal of the third header field represents a radial tilt of the optical recording medium; and
(b) controlling the servo operation based on the difference determined in the step (a).

26. An apparatus for controlling a servo operation of an optical recording medium, the optical recording medium including a non-writable area having first, second, third and fourth header fields in which the first and second header fields are staggered with the third and fourth header fields, the apparatus comprising:
a pickup unit to record or read data on/from the optical recording medium;
a signal detector to detect a difference between a first synchronization reference signal included in the first header field and a second synchronization reference signal included in the third header field, wherein the determined difference between the first and second synchronization reference signals represent a radial tilt of the optical recording medium;
a driving unit to drive the pickup unit; and
a servo controller to control the driving unit based on the determined difference between the first and second synchronization reference signal.

* * * * *